United States Patent
Drayna et al.

(10) Patent No.: US 11,820,326 B2
(45) Date of Patent: *Nov. 21, 2023

(54) VEHICLE DOCKING STATIONS HEARTBEAT AND SECURITY

(71) Applicant: Lyft, Inc., San Francisco, CA (US)

(72) Inventors: Garrett Korda Drayna, San Carlos, CA (US); Rui Ma, Foster City, CA (US); Claude Montpetit, Montreal (CA)

(73) Assignee: Lyft, Inc., San Francisco, CA (US)

( * ) Notice: Subject to any disclaimer, the term of this patent is extended or adjusted under 35 U.S.C. 154(b) by 359 days.

This patent is subject to a terminal disclaimer.

(21) Appl. No.: 17/032,888

(22) Filed: Sep. 25, 2020

(65) Prior Publication Data
US 2021/0261091 A1  Aug. 26, 2021

Related U.S. Application Data

(63) Continuation of application No. 16/797,774, filed on Feb. 21, 2020, now Pat. No. 10,800,378.

(51) Int. Cl.
*B60R 25/102* (2013.01)
*G06F 21/55* (2013.01)
(Continued)

(52) U.S. Cl.
CPC .......... *B60R 25/102* (2013.01); *B60L 53/305* (2019.02); *B60L 53/66* (2019.02);
(Continued)

(58) Field of Classification Search
CPC ........ B60L 53/00; B60L 53/30; B60L 53/305; B60L 53/66; B60L 53/68; Y02T 90/12;
(Continued)

(56) References Cited

U.S. PATENT DOCUMENTS

| 3,802,178 A | 4/1974 | Tsuruishi |
| 4,785,435 A | 11/1988 | Inoue et al. |

(Continued)

FOREIGN PATENT DOCUMENTS

| CA | 2039503 A1 | 10/1992 |
| CA | 2116961 A1 | 3/1993 |

(Continued)

OTHER PUBLICATIONS

Ricci, Lawrence; Low Power Design Makes Solar Power Practical for Montreal Parking System; Information Quarterly, vol. 3, No. 3, 2004, pp. 68-70 (3 pages).

(Continued)

*Primary Examiner* — Andrew W Bee
(74) *Attorney, Agent, or Firm* — Baker Botts L.L.P.

(57) ABSTRACT

Techniques are disclosed for systems and methods to provide reduction in connectivity interruptions between vehicle docking stations and a management server for facilitating micro-mobility vehicle sharing services. To maintain communication sessions between the vehicle docking stations and the management server, heartbeat signals are transmitted periodically by each of the vehicle docking stations to the management server. An unavailability of the connection between a vehicle docking station and the management server may be detected based on an interruption to the heartbeat signals. In response to determining the unavailability of the connection, the management server may instruct a vehicle within a predetermined distance of the vehicle docking station to establish a short-range connection with the vehicle docking station and retrieve docking station data from the vehicle docking station.

20 Claims, 9 Drawing Sheets

(51) Int. Cl.
*B60L 53/66* (2019.01)
*B60L 53/30* (2019.01)
*B60L 53/68* (2019.01)
*H04W 4/44* (2018.01)

(52) U.S. Cl.
CPC ............ B60L 53/68 (2019.02); G06F 21/554 (2013.01); *H04W 4/44* (2018.02); *Y02T 90/12* (2013.01)

(58) Field of Classification Search
CPC .......... G06Q 30/0645; B62H 2003/005; G07F 17/0057; H02J 7/0027; G08G 1/20; H04W 4/44
See application file for complete search history.

(56) References Cited

U.S. PATENT DOCUMENTS

| | | | |
|---|---|---|---|
| 5,917,407 | A | 6/1999 | Squire et al. |
| 6,309,098 | B1 | 10/2001 | Wong |
| 6,384,717 | B1 | 5/2002 | DeVolpi |
| 6,505,774 | B1 | 1/2003 | Fulcher et al. |
| 6,715,673 | B2 | 4/2004 | Fulcher et al. |
| 6,888,472 | B2 | 5/2005 | Yoshimura et al. |
| 7,014,355 | B2 | 3/2006 | Potter et al. |
| 7,027,358 | B1 | 4/2006 | Esposito et al. |
| 7,230,545 | B2 | 6/2007 | Nath et al. |
| 7,898,439 | B2 | 3/2011 | Bettez et al. |
| 9,076,136 | B2 | 7/2015 | Bettez et al. |
| 2002/0008624 | A1 | 1/2002 | Paek |
| 2003/0090363 | A1 | 5/2003 | Ogura et al. |
| 2003/0102975 | A1 | 6/2003 | Hache |
| 2004/0122688 | A1 | 6/2004 | Janda |
| 2006/0212344 | A1 | 9/2006 | Marcus et al. |
| 2007/0239465 | A1 | 10/2007 | Le Gars |
| 2010/0211643 | A1* | 8/2010 | Lowenthal ............... B60L 53/14 709/206 |
| 2010/0228405 | A1 | 9/2010 | Morgal et al. |
| 2012/0095594 | A1* | 4/2012 | Grigoryan ............... B60L 53/65 700/237 |
| 2012/0143401 | A1* | 6/2012 | Jayadevappa ....... E05B 47/0012 701/2 |
| 2017/0036722 | A1* | 2/2017 | Assénat .................... B62H 3/00 |
| 2017/0098273 | A1* | 4/2017 | Meehan ............. G06Q 30/0645 |
| 2019/0160957 | A1* | 5/2019 | Hooker ................. B60L 53/665 |
| 2019/0263281 | A1* | 8/2019 | Wang ..................... B60L 53/60 |

FOREIGN PATENT DOCUMENTS

| | | |
|---|---|---|
| CA | 2064178 A1 | 9/1993 |
| CA | 2074997 A1 | 1/1994 |
| CA | 2081034 A1 | 4/1994 |
| CA | 2091726 A1 | 9/1994 |
| CA | 2162384 A1 | 12/1994 |
| CA | 2102339 A1 | 5/1995 |
| CA | 2124129 A1 | 11/1995 |
| CA | 2154033 A1 | 1/1996 |
| CA | 2209289 A1 | 7/1996 |
| CA | 2226325 A1 | 1/1997 |
| CA | 2230554 A1 | 3/1997 |
| CA | 2262979 A1 | 8/1997 |
| CA | 2046386 C | 2/1998 |
| CA | 2207588 A1 | 12/1998 |
| CA | 2142652 C | 1/1999 |
| CA | 2279709 A1 | 2/2000 |
| CA | 2279078 A1 | 8/2000 |
| CA | 2039435 C | 8/2001 |
| CA | 2352037 A1 | 12/2002 |
| CA | 2472976 A1 | 10/2005 |
| CA | 2260326 A1 | 4/2006 |
| CA | 2527616 A1 | 5/2006 |
| CA | 2519843 A1 | 3/2007 |
| DE | 4407804 A1 | 10/1994 |
| DE | 10301887 A1 | 7/2004 |
| DE | 202006004849 U1 | 6/2006 |
| EP | 1382519 A2 | 1/2004 |
| FR | 2764261 B1 | 8/1999 |
| FR | 2824942 A1 | 11/2002 |
| GB | 2383882 A | 7/2003 |
| JP | 2000172747 A2 | 6/2000 |
| JP | 2001338238 A2 | 12/2001 |
| JP | 2002008128 A2 | 1/2002 |
| JP | 2002063646 A2 | 2/2002 |
| JP | 2002140763 A2 | 5/2002 |
| JP | 2003331395 A | 11/2003 |
| JP | 2005078223 A2 | 3/2005 |
| JP | 2005122675 A2 | 5/2005 |
| JP | 2005173993 A2 | 6/2005 |
| JP | 2005180161 A | 7/2005 |
| JP | 2005202900 A2 | 7/2005 |
| JP | 2005293402 A2 | 10/2005 |
| JP | 2006185402 A2 | 7/2006 |
| JP | 2006336262 A | 12/2006 |
| KR | 100806049 B1 | 2/2008 |
| KR | 2009/0008485 A | 1/2009 |
| WO | WO 2002/067210 A1 | 8/2002 |
| WO | WO 2005/049417 A1 | 6/2005 |
| WO | WO 2005/068280 A1 | 7/2005 |
| WO | WO 2005/077740 A1 | 8/2005 |
| WO | WO 2005/001781 A1 | 12/2005 |
| WO | WO 2006/095092 A1 | 9/2006 |
| WO | WO 2006/120328 A1 | 11/2006 |
| WO | WO 2007/020308 A2 | 2/2007 |
| WO | WO 2006/014105 A1 | 2/2009 |

OTHER PUBLICATIONS

International Search Report from corresponding application PCT/IB2009/005466, dated Oct. 1, 2009 (4 pages).

European Search Report, Application No. 09721977.8 dated Apr. 20, 2011 (8 pages).

IT World Canada.com "Wireless, solar power drives Montreal bike rentals" Nov. 11, 2008 (1 page).

Office Action, U.S. Appl. No. 12/052,309, USPTO dated Apr. 28, 2010 (11 pages).

* cited by examiner

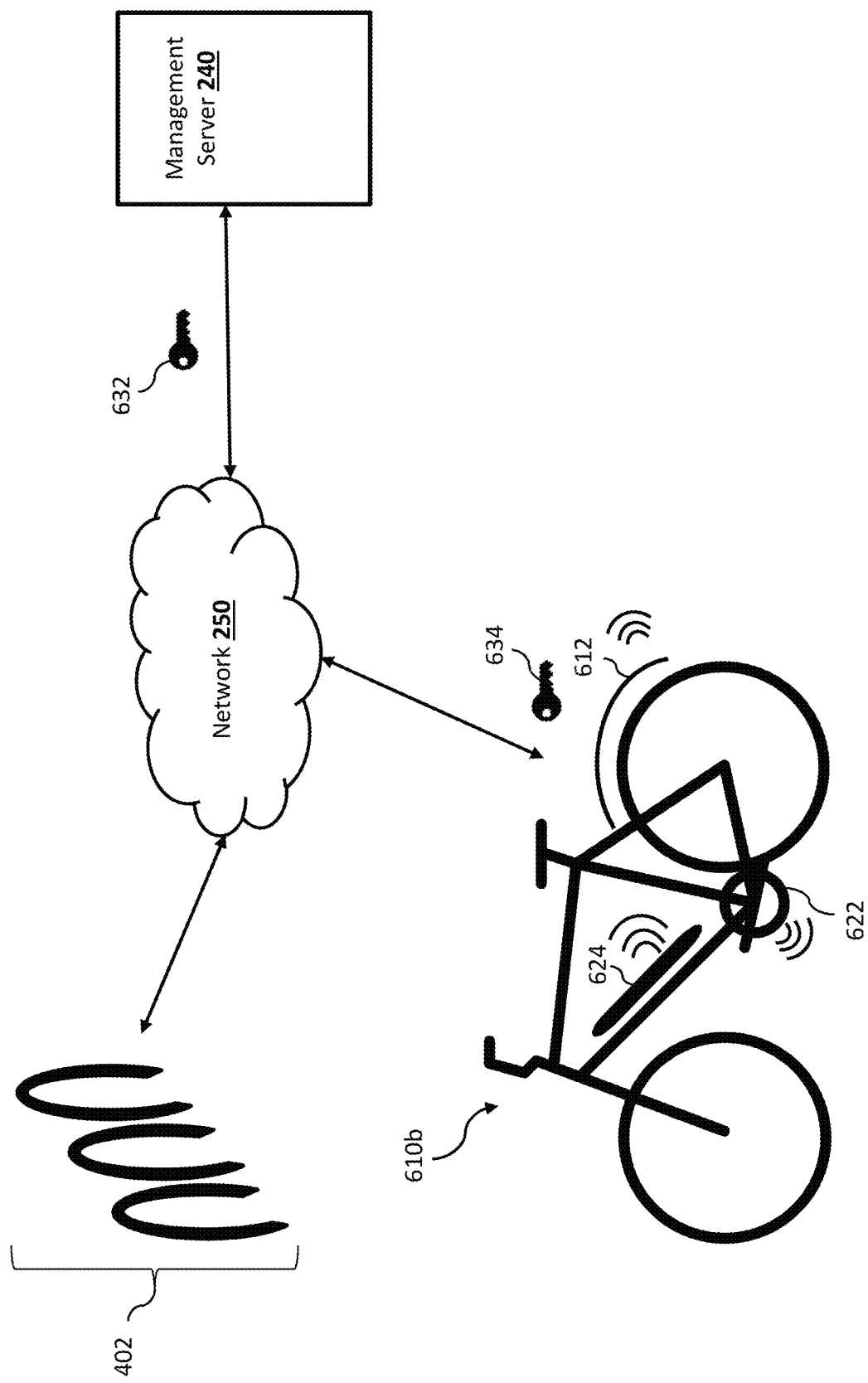

US 11,820,326 B2

VEHICLE DOCKING STATIONS HEARTBEAT AND SECURITY

CROSS REFERENCE TO RELATED APPLICATION

The present invention is a Continuation of U.S. patent application Ser. No. 16/797,774, filed Feb. 21, 2020, which is incorporated herein by reference in its entirety.

TECHNICAL FIELD

One or more embodiments of the present disclosure relate generally to shared vehicles and more particularly, to improving communication with and security of shared micro-mobility fleet vehicles.

BACKGROUND

Shared micro-mobility fleet vehicles, such as electric bicycles, electric scooters and the like, allow transportation requesters to travel within short distances with ease. To further improve the ease of reserving, using, and returning the vehicles, multiple vehicle docking stations can be set up around a neighborhood, such as a city, such that transportation requesters may hire, use, and return the vehicles at any of the vehicle docking stations near them. In order for a management server associated with a transportation provider to track the statuses (e.g., reservation statuses, physical conditions, etc.) of the shared vehicles, it is crucial for the management server to be able to communicate with the vehicles and the vehicle docking stations. In addition, due to the compact size of the shared vehicles, tampering and/or theft can be a common occurrence. Thus, there is a need in the art to provide a mechanism to maintain communication between the docking stations and the management server, and to detect tampering of the shared vehicles.

SUMMARY

Techniques are disclosed for systems and methods to provide reduction in connectivity interruptions between vehicle docking stations and a management server associated with a transportation provider, and detection of tampering of shared micro-mobility vehicles. In accordance with one or more embodiments, a system may include a non-transitory memory and one or more hardware processors coupled to the non-transitory memory and configured to read instructions from the non-transitory memory to cause the system to perform operations comprising: detecting an interruption to heartbeat signals between a vehicle docking station and a remote server; determining that a connectivity between the vehicle docking station and the remote server is unavailable based on the detected interruption; obtaining location information from the vehicle; determining that a vehicle is within a predetermined distance from the vehicle docking station based on the location information; transmitting, to the vehicle, a signal that causes the vehicle to establish a short-range communication connection with the vehicle docking station; and retrieving, from the vehicle, station data associated with the docking station obtained via the short-range communication connection.

In other embodiments, a method may include transmitting, by a vehicle docking station, heartbeat signals to a remote server, wherein the heartbeat signals comprise station data; receiving, by the vehicle docking station, a request to establish a short-range communication connection from a vehicle; establishing, by the vehicle docking station, the short-range communication connection with the vehicle; and transmitting, by the vehicle docking station, the station data to the vehicle via the short-range communication connection.

In other embodiments, a non-transitory machine-readable memory has stored thereon machine-readable instructions executable to cause a machine to perform operations including: detecting an interruption to heartbeat signals between a vehicle docking station and a remote server; determining that a connectivity between the vehicle docking station and the remote server is unavailable based on the detected interruption; determining that a vehicle is within a predetermined distance from the vehicle docking station based on location information obtained from the vehicle; causing the vehicle to establish a short-range communication connection with the vehicle docking station; and obtaining station data associated with the docking station via the short-range communication connection.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 6 illustrates a communication network for detecting tampering of a shared micro-mobility fleet vehicle.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
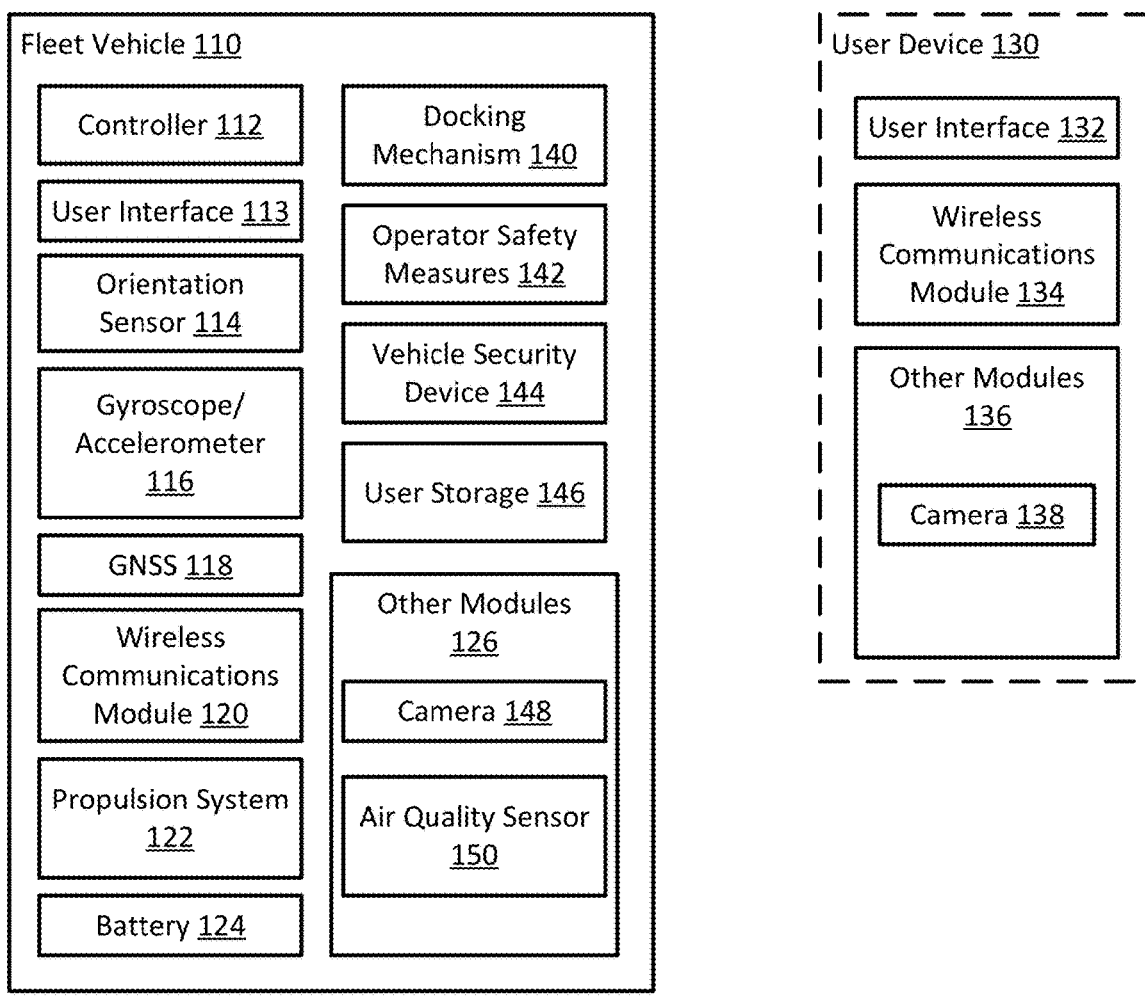
FIG. 1 illustrates a block diagram of a portion of a dynamic transportation matching system including a shared micro-mobility fleet vehicle in accordance with an embodiment of the disclosure.

In accordance with various embodiments of the present disclosure, systems and methods address connectivity interruptions between vehicle docking stations and a management server (e.g., a remote server) associated with a transportation provider, such as Lyft, Inc., based in San Francisco, Calif., and detection of tampering of shared micro-mobility fleet vehicles. As discussed above, a micro-mobility vehicle sharing service (or transportation provider) that manages and facilitates sharing of micro-mobility fleet vehicles may require a management server to have frequent communication with various vehicle docking stations. In some embodiments, each vehicle docking station that is operating may be configured to establish a communication session (e.g., a Transmission Control Protocol/Internet Protocol (TCP/IP) communication session) with the management server over a network. Through the communication session between the management server and a corresponding vehicle docking station, updated information (also referred to as docking station data) associated with the vehicle docking station, such as an operating status of the vehicle docking station, identities (and a number) of the shared micro-mobility fleet vehicles docked at the vehicle docking station, a charge status(es) of one or more of the shared micro-mobility fleet vehicles docked at the vehicle docking station, information indicating physical condition(s) of the shared micro-mobility fleet vehicles docked at the vehicle docking station, network information associated with the vehicle docking station, battery information associated with the vehicle docking station, and other information of the vehicle docking station may be transmitted by the vehicle docking station to the management server (e.g., on a periodic basis).

Thus, based on the information received from the various vehicle docking stations, the management server of a transportation provider may access and provide up-to-date statuses of the shared micro-mobility fleet vehicles to transportation requesters and to manage and facilitate the sharing of the micro-mobility fleet vehicles for the transportation requesters. For example, upon receiving a request to hire a micro-mobility vehicle from a transportation requester, the management server may assign a particular shared micro-mobility fleet vehicle to the transportation requester based on operating statuses (e.g., reservation statuses, hiring statuses, charge statuses, etc.) of the shared micro-mobility fleet vehicles at one or more vehicle docking stations within a predetermined distance to the transportation requester. Similarly, through the communication sessions with the various vehicle docking stations, the management server may transmit data, such as instructions to unlock one or more of the shared micro-mobility fleet vehicles based on hiring requests received from transportation requesters, to the vehicle docking stations.

In order to maintain the communication session (e.g., to keep the communication session alive, to prevent a network service provider from closing a TCP socket, etc.), each of the vehicle docking stations may be configured to transmit heartbeat signals to the management server via the communication session. The heartbeat signals may be signals that the vehicle docking stations periodically transmit to the management server at a predetermined or a periodic frequency (e.g., every 5 seconds, every minute, every 10 minutes, etc.). In some embodiments, when the management server receives a heartbeat signal from a vehicle docking station, the management server may be configured to respond with an acknowledgement signal to acknowledge to the vehicle docking station the receipt of the heartbeat signal.

In some embodiments, the heartbeat signals do not carry any additional data other than the indication of an availability of the corresponding vehicle docking station. In other words, the heartbeat signals merely serve the purpose of keeping the communication session with the management server alive and indicating to the management server that the vehicle docking station is operational. In some embodiments, however, at least some of the docking station data associated with the vehicle docking station may be embedded into the heartbeat signals such that information associated with the vehicle docking station can be communicated to the management server via the heartbeat signals. One benefit of embedding the docking station data into the heartbeat signals is that it increases the functionality of the heartbeat signals, such that the heartbeat signals not only indicate the availability of the vehicle docking station, but also relay additional information associated with the vehicle docking station to the management server. In some embodiments, all of the docking station data (e.g., all of the information associated with the vehicle docking station for transmitting to the management server) can be embedded into each heartbeat signal as a package and transmitted to the management server at the predetermined or the periodic frequency (e.g., every 5 seconds, every 1 minute, etc.). Thus, at each interval, the vehicle docking station may obtain updated data (e.g., retrieving identities of the docked vehicles, retrieving charged status(es) of the docked vehicles, obtaining battery status of the docking station, etc.), may encapsulate the docking station data into a heartbeat signal according to a predetermined format, and may transmit the heartbeat signal to the management server. In addition, each heartbeat signal may also include metadata such as a timestamp indicating a time that the heartbeat signal is generated (or is transmitted from the vehicle docking station), an identifier of the vehicle docking station, and other types of metadata related to the vehicle docking station.

In some other embodiments, such as when the heartbeat frequency is sufficiently high, the docking station data may be divided into multiple portions, and different heartbeat signals may carry different portions of the docking station data for transmitting to the management server. For example, when the docking station data is divided into five different portions, the vehicle docking station may embed one of the five different portions into each heartbeat signal. Thus, at a first interval, the vehicle docking station may obtain a first portion of the docking station data, embed the first portion of the docking station data into a first heartbeat signal, and transmit the first heartbeat signal to the management server. At a second interval, the vehicle docking station may obtain a second portion of the docking station data, embed the second portion of the docking station data into a second heartbeat signal, and transmit the second heartbeat signal to the management server. The vehicle docking station may continue to embed different portions of docking station data in different heartbeat signals for transmitting to the management server. After obtaining a fifth portion of the docking station data, embedding the fifth portion of the docking station data into a fifth heartbeat signal, and transmitting the fifth heartbeat signal to the management server, the vehicle docking station may begin the cycle again by obtaining updated information associated with the first portion of the docking station data and transmitting the first portion of docking station data in a heartbeat signal (e.g., a sixth heartbeat signal) to the management server.

As discussed above, to improve the ease of hiring and returning the shared micro-mobility fleet vehicles, various vehicle docking stations may be set up at different locations within an area (e.g., a neighborhood, a city, etc.). Since the vehicle docking stations are scattered around the area, the connections between the vehicle docking stations and the management server may include one or more wireless connections (e.g., a cellular connection, a Wi-Fi connection, etc.). Due to the different environments (and often changing environments) at the different locations, the connection between a vehicle docking station and the management server may become unavailable intermittently (e.g., interrupted). For example, certain weather conditions, physical obstructions (e.g., a tree, a truck that is parked near the vehicle docking station, a building, etc.) and other factors may affect the strength and the availability of a connection between the vehicle docking station and a nearby wireless transmitter (e.g., a base station, a Wi-Fi access point, etc.), which is part of the connection with the management server.

The temporary interruptions of the connection between any vehicle docking station and the management server can be problematic for the micro-mobility sharing service. For example, due to connection interruptions, the management server may not access or be able to obtain up-to-date information associated with a vehicle docking station (and the shared micro-mobility fleet vehicles docked at the vehicle docking station), which may affect its ability to manage and facilitate the micro-mobility vehicle sharing among transportation requesters. For example, since a locking mechanism for locking a shared micro-mobility fleet vehicle at the vehicle docking station may be implemented within the vehicle docking station in some embodiments, without the connection with the vehicle docking station, the management server may not determine whether a shared micro-mobility fleet vehicle is docked at (e.g., returned to) the vehicle docking station, which may affect the services provided by the micro-mobility vehicle sharing service. Similarly, the management server may not be able to transmit instructions to the vehicle docking station including instructions to unlock one or more of the shared micro-mobility fleet vehicles docked at the vehicle docking station. Furthermore, without knowing the hiring statuses of the shared micro-mobility fleet vehicles, the management server may not be able to determine an accurate lapse of time that a transportation requester has been using a micro-mobility vehicle (which may affect how much should be charged to the transportation requester), and an availability of a shared micro-mobility fleet vehicle, which may adversely impact other transportation requesters desiring to use or hire a shared micro-mobility fleet vehicle.

In addition, the interruption of connectivity between a vehicle docking station and the management server may also affect the management server's ability to detect tampering and/or theft of shared micro-mobility fleet vehicles. In some embodiments, mechanisms may be implemented for protecting the micro-mobility vehicle against tampering and/or theft. For example, a propulsion system of the shared micro-mobility fleet vehicle may include a motor controller for controlling a motor (e.g., an electric motor) of the shared micro-mobility fleet vehicle. The motor controller may be configured to prevent the motor from operating (e.g., locking the motor, cutting off current to the motor, etc.) unless the shared micro-mobility fleet vehicle has received authorization from the management server (e.g., when a transportation requester has hired the shared micro-mobility fleet vehicle, etc.). In another example, a battery module of the shared micro-mobility fleet vehicle may be configured to prevent the battery from sending current to the propulsion system of the shared micro-mobility fleet vehicle unless the battery module receives authorization from the management server. It is a common occurrence for malicious users to tamper with a shared micro-mobility fleet vehicle, such as by removing the motor controller of the propulsion system and/or the battery module (e.g., by swapping the motor controller and/or the battery module with a generic unit that does not have the security mechanism, etc.) such that the malicious users may take over the shared micro-mobility fleet vehicle without proper authorization from the management server or the transportation provider. For example, a malicious user may use a legitimate account of a transportation requester with the micro-mobility vehicle sharing service to hire a micro-mobility vehicle. However, instead of returning the micro-mobility vehicle to a vehicle docking station, the malicious user may tamper with the micro-mobility vehicle by, for example, replacing the motor controller and/or the battery module to take over the micro-mobility vehicle without authorization from the management server. Without a connectivity between a vehicle docking station and the management server, the management server may not be able to determine whether the shared micro-mobility fleet vehicle has been returned (e.g., docked) to the vehicle docking station before it was tampered with.

Therefore, according to some embodiments of the disclosure, the management server and/or a vehicle docking station may be configured to determine an interruption (e.g., a temporary unavailability) of a connectivity (e.g., the communication connection) between the management server and the vehicle docking station based on detecting an interruption to the heartbeat signals and/or the acknowledgment signals, and may establish an alternative means of communication to maintain or re-establish a communication between the vehicle docking station and the management server. In one example, the management server and/or the docking station may detect an interruption to the connectivity based on a connection termination signal (e.g., a TCP_FIN signal) received over the communication connection. In another example, the management server and/or the vehicle docking stations may monitor the heartbeat signals transmitted by each of the various vehicle docking stations and may detect a missing heartbeat signal from any one of the vehicle docking stations. As discussed above, the heartbeat signals are transmitted from each of the vehicle docking stations to the management server according to a predetermined frequency (e.g., a predetermined interval). When the management server fails to receive a heartbeat signal from a vehicle docking station at the predetermined interval (or fails to receive a predetermined number of heartbeat signals (e.g., 2, 5, 8, etc.) within a time period), the management server may determine that the connectivity with the vehicle docking station has been interrupted. In response to determining that the connectivity with the vehicle docking station is interrupted, the management server may determine an alternate means to communicate with the vehicle docking station to maintain communication with the vehicle docking station. In some embodiments, the management server may determine a vehicle (e.g., a shared micro-mobility fleet vehicle, a ride-sharing car, a public transportation vehicle, etc.) that is within a distance threshold (e.g., a range of a wireless short-range communication technology, such as Bluetooth®, etc.) from the vehicle docking station, based on a detected location of the vehicle. Since the vehicle may communicate with the management server using a different connection than the vehicle docking station (e.g., a different cellular carrier, a different wireless communication technology, etc.) or using communication components different than the vehicle docking station (e.g., stronger transceiver, larger antenna, etc.), the connection between the vehicle and the management server may not be affected by the condition that has affected the connection between the vehicle docking station and the management server. In some embodiments, each fleet vehicle may include a communication module (also referred to as a controller or the Internet-of-Things (IoT) module) for communicating with the management server via a network (e.g., a cellular network, etc.). Thus, the management server may communicate with the vehicle via the communication module of the vehicle. In some other embodiments, the management server may communicate with a mobile device associated with the driver and/or the passenger of the fleet vehicle. Thus, the management server may transmit a signal to the vehicle to instruct the vehicle to establish a connection (e.g., a short-range wireless connection such as a Bluetooth® connection, an infrared connection, a radio-frequency communication channel, etc.) with the vehicle docking station. The management server may also instruct the vehicle to obtain docking station data from the vehicle docking station and relay the docking station data to the management server.

Similarly, the vehicle docking station may monitor the acknowledgment signals transmitted from the management server in response to the heartbeat signals and may detect a missing acknowledgement signal. When the vehicle docking station fails to receive a corresponding acknowledgement signal from the management server after a time threshold from sending a heartbeat signal (e.g., 2 seconds, 5 seconds, etc.) (or fails to receive a predetermined number of acknowledgement signals (e.g., 2, 5, 8, etc.)), the vehicle docking station may determine that the connection between the vehicle docking station and the management server has been interrupted. In response to determining that the connection between the vehicle docking station and the management server is interrupted, the vehicle docking station may detect any nearby vehicles, such as any micro-mobility vehicle that is docked at the vehicle docking station or any vehicle (e.g., a micro-mobility vehicle, a ride-sharing car, a public transportation vehicle, etc.) that is within a distance threshold from the vehicle docking station. The vehicle docking station may establish a connection (e.g., a short-range wireless connection such as a Bluetooth® connection, an infrared connection, a radio-frequency communication channel, etc.) with the detected vehicle. After establishing the connection with the vehicle, the vehicle docking station may transmit up-to-date or real-time docking station data to the vehicle and instruct the vehicle to relay the docking station data to the management server.

By relaying the docking station data via an intermediate vehicle to the management server, the management server may continue to receive updated docking station data from a vehicle docking station while the direct connection with the vehicle docking station is temporarily unavailable. The vehicle that relays the docking station data may be a micro-mobility vehicle that is already docked at the vehicle docking station, a micro-mobility vehicle that is within the distance threshold of the vehicle docking station (e.g., approaching the vehicle docking station and about to be docked at the vehicle docking station), or a vehicle (e.g., a micro-mobility vehicle, a ride-sharing car, a public transportation vehicle) that is passing by the vehicle docking station. The management server may continue to instruct the vehicle to obtain docking station data from the vehicle docking station and transmit the docking station data to the management server until either (1) the management server detects that the connection with the vehicle docking station has been restored (e.g., the management server begins receiving the heartbeat signals from the vehicle docking station over a certain time period, such as two periods, five periods, or any desired number that indicates communication has likely been restored) or (2) the wireless short-range connection between the vehicle and the vehicle docking station becomes unavailable (e.g., the vehicle has moved outside of the operational range of a wireless transmitter, etc.). When the management server determines that the wireless short-range connection between the vehicle and the vehicle docking station becomes unavailable, the management server may detect another vehicle (e.g., a second vehicle) that is within the distance threshold from the vehicle docking station and instruct the second vehicle to obtain and relay docking station data from the vehicle docking station.

Similarly, the vehicle docking station may continue to transmit docking station data to the vehicle and instruct the vehicle to relay the docking station data to the management server until either (1) the vehicle docking station detects that the connection with the management server has been restored (e.g., the vehicle docking station may continue to transmit the heartbeat signals to the management server even when the connection is interrupted, and the vehicle docking station may determine a restoration of the connection by detecting the acknowledgement heartbeat signals from the management server) or (2) the wireless short-range connection between the vehicle and the vehicle docking station becomes unavailable (e.g., the vehicle moves outside of the operational range of a short-range wireless transmitter). When the vehicle docking station determines that the wireless short-range connection between the vehicle and the vehicle docking station becomes unavailable, the vehicle docking station may detect another vehicle (e.g., a second vehicle) that is within the distance threshold from the vehicle docking station. The vehicle docking station may transmit docking station data to the second vehicle and instruct the second vehicle to relay the docking station data to the management server.

Through relaying docking station data via one or more vehicles, the management server may access docking station data from the various vehicle docking stations even when the connection with one or more vehicle docking station becomes unavailable. Thus, the management server may determine the statuses of the vehicles in real-time without interruptions. For example, the management server may determine whether a shared micro-mobility fleet vehicle has been returned to a vehicle docking station.

Furthermore, the management server and/or the vehicle docking station may detect any tampering of a shared micro-mobility fleet vehicle through the short-range connection established between the shared micro-mobility fleet vehicle and the vehicle docking station. As discussed above, a malicious user may tamper with a shared micro-mobility fleet vehicle by removing (e.g., and replacing) one or more components (e.g., a vehicle controller, a motor controller of the propulsion system, a battery module, etc.) from the micro-mobility vehicle. Thus, in another aspect of the disclosure, a security mechanism may be provided to shared micro-mobility fleet vehicles of the micro-mobility vehicle sharing service to enhance security of the shared micro-mobility fleet vehicles. In some embodiments, some of the components (e.g., a vehicle controller, a motor controller, a battery module) of a shared micro-mobility fleet vehicle may include one-time programmable (OTP) memories. An OTP memory is a type of read-only memory (ROM), that once data is written on the OTP memory, the data is stored permanently and cannot be modified. When the shared micro-mobility fleet vehicle is powered up for the first time after being released from a factory, the shared micro-mobility fleet vehicle may be configured to provide current sufficient to only power up the vehicle controller (e.g., an Internet-of-things (IOT) module) for transmitting a provisioning signal to the management server, but not sufficient to power the motor and/or other components of the shared micro-mobility fleet vehicle. The provisioning signal may include an identifier (e.g., a serial number) of the shared micro-mobility fleet vehicle.

When the management server receives the provisioning signal, the management server may determine a key for the shared micro-mobility fleet vehicle. For example, the key may be a hashed key that is generated by hashing the identifier of the shared micro-mobility fleet vehicle using a particular hashing function. In some embodiments, the key is a 128-bit encryption key generated based at least in part on the identifier of the shared micro-mobility fleet vehicle. The management server may transmit the key to the shared micro-mobility fleet vehicle, as a response to the provisioning signal. Once the key is received, the vehicle controller of the shared micro-mobility fleet vehicle may store the key in its OTP memory. In subsequent operations of the shared micro-mobility fleet vehicle, the vehicle controller is configured to power and/or unlock other components (e.g., the propulsion system, the battery module, other components, etc.) of the shared micro-mobility fleet vehicle only upon receiving the key from the management server. Thus, to unlock the shared micro-mobility fleet vehicle (e.g., when the management server has received a hiring request from a transportation requester for using the shared micro-mobility fleet vehicle, etc.), the management server may transmit an unlock signal that includes the key to the shared micro-mobility fleet vehicle. Upon receiving the unlock signal, the vehicle controller of the shared micro-mobility fleet vehicle may determine whether the key included in the unlock signal matches the key stored in its OTP memory. If the two keys match, the vehicle controller may power and/or unlock other components of the shared micro-mobility fleet vehicle.

In some embodiments, in addition to the vehicle controller, at least some of the other components of a shared micro-mobility fleet vehicle may also include their own OTP memories for storing their respective keys. For example, after receiving the key from the management server, the vehicle controller may transmit a key to at least some of the components of the micro-mobility vehicle. The key that is transmitted to the other components may be the same key that was received from the management server. Alternatively, the vehicle controller may generate a different key for the other components (e.g., another encryption key generated based at least in part on the identifier of the shared micro-mobility fleet vehicle, etc.), and transmit the generated key to the other components. The components may store the key in their respective OTP memories or within a shared memory accessible by two or more of the components. Each of those components may be configured to be activated only after the key is received. For example, after receiving the key from the management server, the vehicle controller may transmit the key (or a different generated key) to other components of the shared micro-mobility fleet vehicle for powering and/or unlocking the other components.

By using the key-based unlocking process, in order to unlock (e.g., activate) a shared micro-mobility fleet vehicle (e.g., to operate the shared micro-mobility fleet vehicle), the vehicle controller of the shared micro-mobility fleet vehicle must first receive the correct key from the management server, and the other components of the shared micro-mobility fleet vehicle must receive their corresponding keys from the vehicle controller. Thus, a malicious user may not be able to take over a micro-mobility vehicle by simply removing the vehicle controller from the shared micro-mobility fleet vehicle—without the vehicle controller providing the corresponding key(s) to the other components, the other components would not operate. Furthermore, since the key is required by multiple components to operate, removing and/or replacing one or two components with generic versions of the components (e.g., without the key-based security measures) would not render the shared micro-mobility fleet vehicle operable without the authorization from the management server. For example, even if the malicious user replaces the motor controller with another motor controller that does not require a key to operate, the battery module would still not provide power to the propulsion system unless it receives the key from the vehicle controller.

In some embodiments, the vehicle controller may authenticate the other components based on the key(s) that was assigned (e.g., distributed) to the other components. For example, the vehicle controller may authenticate the components of the shared micro-mobility fleet vehicle before unlocking the shared micro-mobility fleet vehicle. Thus, upon receiving the unlock request (and the key) from the management server, the vehicle controller may attempt to authenticate the other components of the shared micro-mobility fleet vehicle before unlocking the shared micro-mobility fleet vehicle. In some embodiments, the vehicle controller may request the other components to provide the key that is stored in their respective OTP memories. The vehicle controller may then determine whether the keys retrieved from the other components match the keys that were assigned (distributed) to the other components during the provisioning of the shared micro-mobility fleet vehicle. If all of the keys from the other components match the assigned key, the vehicle controller may authenticate the components and may unlock the shared micro-mobility fleet vehicle. If any one of the keys from the components does not match (or no key is received from any one of the components), the vehicle controller may determine that the corresponding component is not authenticated and may have been tampered with. In some embodiments, if the vehicle controller fails to authenticate any one of the components of the shared micro-mobility fleet vehicle, the vehicle controller may not unlock the shared micro-mobility fleet vehicle (e.g., prevent the shared micro-mobility fleet vehicle from being unlocked). The vehicle controller may also transmit a signal to the management server indicating that the shared micro-mobility fleet vehicle has been tampered with.

When tampering with a shared micro-mobility fleet vehicle, a malicious user may also tamper with (e.g., remove, replace, etc.) the vehicle controller of the shared micro-mobility fleet vehicle such that the shared micro-mobility fleet vehicle cannot transmit any tampering report to the management server via the vehicle controller. While the vehicle controller may be the only component in the shared micro-mobility fleet vehicle that may communicate with the management server (e.g., via a cellular network, etc.), many other components of the shared micro-mobility fleet vehicle may be equipped with a wireless short-range communication module (e.g., a Bluetooth® transmitter, etc.) for conducting short-range wireless communication with other devices. Thus, in some embodiments, each of the components of a shared micro-mobility fleet vehicle may detect tampering of any other component (e.g., removing, replacing, etc.) of the shared micro-mobility fleet vehicle.

When a component detects that another component (e.g., the motor controller, the battery module, the vehicle controller, etc.) of the shared micro-mobility fleet vehicle has been tampered with, the component may establish a connection (e.g., a wireless short-range connection) with a vehicle docking station or with another vehicle. The component may then transmit a tampering report signal that may include the identifier of the shared micro-mobility fleet vehicle to the vehicle docking station or the other vehicle, and instruct the vehicle docking station or the other vehicle to relay the tampering report to the management server. Thus, the vehicle docking station (or the other vehicle) may determine that a nearby shared micro-mobility fleet vehicle has been tampered with, and may modify (e.g., increase) a security level with other shared micro-mobility fleet vehicles within the area (e.g., the shared micro-mobility fleet vehicles that are docked at the vehicle docking station). For example, in response to determining that a nearby shared micro-mobility fleet vehicle has been tampered with, the vehicle docking station may require additional credentials (e.g., biometrics, etc.) from a user (which could be the transportation requestor or a malicious user) when hiring or attempting to use a shared micro-mobility fleet vehicle that is docked at the vehicle docking station.

FIG. 1 illustrates a block diagram of a portion of a dynamic transportation matching system (e.g., system 100) including a fleet vehicle 110 in accordance with an embodiment of the disclosure. In the embodiment shown in FIG. 1, system 100 includes fleet vehicle 110 and an optional user device 130. In general, fleet vehicle 110 may be a passenger vehicle designed to transport a single user or two users (e.g., a shared micro-mobility fleet vehicle, such as an electronic scooter or electronic bicycle) or a group of people (e.g., a typical car or truck). More specifically, fleet vehicle 110 may be implemented as a motorized or electric kick scooter, bicycle, and/or motorized vehicle designed to transport one or perhaps two people at once typically on a paved road (collectively, shared micro-mobility fleet vehicles), as a typical automobile configured to transport larger numbers of people at once, or according to a variety of different transportation modalities (e.g., transportation mechanisms). Fleet vehicles similar to fleet vehicle 110 may be owned, managed, and/or serviced primarily by a fleet manager/servicer, such as Lyft, Inc., providing fleet vehicle 110 for rental and use by the public as one or more types of transportation modalities offered by a dynamic transportation matching system, for example, or may be owned, managed, and/or serviced by a private owner using the dynamic transportation matching system to match their vehicle to a transportation request, such as with ridesharing or ridesourcing applications typically executed on a mobile user device, such as user device 130 as described herein. Optional user device 130 may be a smartphone, smart watch, tablet, near field communication (NFC) or radio-frequency identification (RFID) enabled smart card, or other personal or portable computing and/or communication device that may be used to facilitate rental and/or operation of fleet vehicle 110.

As shown in FIG. 1, fleet vehicle 110 may include one or more of a controller 112 (which may also be referred to as the Internet-of Things (IoT) module), a user interface 113, an orientation sensor 114, a gyroscope/accelerometer 116, a global navigation satellite system receiver (GNSS) 118, a wireless communications module 120, a camera 148, a propulsion system 122, an air quality sensor 150, and other modules 126. Operation of fleet vehicle 110 may be substantially manual, autonomous, and/or partially or completely controlled by optional user device 130, which may include one or more of a user interface 132, a wireless communications module 134, a camera 138, and other modules 136. In other embodiments, fleet vehicle 110 may include any one or more of the elements of user device 130. In some embodiments, one or more of the elements of system 100 may be implemented in a combined housing or structure that can be coupled to or within fleet vehicle 110 and/or held or carried by a user (or transportation requester) of system 100.

Controller 112 (also referred to as "vehicle controller") may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of fleet vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user via user interface 113 or 132. In some embodiments, controller 112 may be integrated with one or more other elements of fleet vehicle 110, for example, or distributed as multiple logic devices within fleet vehicle 110 and/or user device 130.

In some embodiments, controller 112 may be configured to substantially continuously monitor and/or store the status of and/or sensor data provided by one or more elements of fleet vehicle 110 and/or user device 130, such as the position and/or orientation of fleet vehicle 110 and/or user device 130, for example, and the status of a communication link established between fleet vehicle 110 and/or user device 130. Such communication links may be established and then provide for transmission of data between elements of system 100 substantially continuously throughout operation of system 100, where such data includes various types of sensor data, control parameters, and/or other data.

In some embodiments, controller 112 may include a transmitter module (e.g., a wireless transmitter) for communicating with the management server via one or more wireless network (e.g., a cellular network, a Wi-Fi network, etc.). The controller 112 may communicate vehicle data (e.g., a hiring status, a battery charge level, information related to authentication of other components of the micro-mobility vehicle, etc.) to the management server.

User interface 113 of fleet vehicle 110 may be implemented as one or more of a display, a touch screen, a keyboard, a mouse, a joystick, a knob, a steering wheel, a yoke, and/or any other device capable of accepting user input and/or providing feedback to a user (or transportation requester). In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of fleet vehicle 110 and/or other elements of system 100. For example, user interface 113 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause fleet vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of fleet vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices or components of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of fleet vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of fleet vehicle 110 (e.g., or an element of fleet vehicle 110) based on wireless signals received from space-born and/or terrestrial sources (e.g., e-Loran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as Wi-Fi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described in commonly owned U.S. application Ser. No. 16/716,375, which is incorporated by reference in its entirety.

In some embodiments, wireless communications module 120 may be configured to be physically coupled to fleet vehicle 110 and to monitor the status of a communication link established between fleet vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein. In some embodiments, multiple wireless communications modules 120 may be implemented within other modules (e.g., controller 112, a motor controller of the propulsion system 122, a battery module within the battery 124, etc.) of the fleet vehicle 110.

Propulsion system 122 may be implemented as one or more motor-based propulsion systems, and/or other types of propulsion systems that can be used to provide motive force to fleet vehicle 110 and/or to steer fleet vehicle 110. In some embodiments, propulsion system 122 may include elements (e.g., a motor controller) that can be controlled (e.g., by controller 112 and/or user interface 113) to provide motion for fleet vehicle 110 and to provide an orientation for fleet vehicle 110. In various embodiments, propulsion system 122 may be implemented with a portable power supply, such as a battery and/or a combustion engine/generator and fuel supply.

For example, in some embodiments, such as when propulsion system 122 is implemented by an electric motor (e.g., as with many micro-mobility fleet vehicles), fleet vehicle 110 may include battery 124. Battery 124 may be implemented by one or more battery cells (e.g., lithium ion battery cells) and be configured to provide electrical power to propulsion system 122 to propel fleet vehicle 110, for example, as well as to various other elements of system 100, including controller 112, user interface 113, and/or wireless communications module 120. In some embodiments, battery 124 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of fleet vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 100 (e.g., controller 112) to provide operational control of fleet vehicle 110 and/or system 100. In further embodiments, other modules 126 may include a light, such as a headlight or indicator light, and/or an audible alarm, both of which may be activated to alert passersby to possible theft, abandonment, and/or other critical statuses of fleet vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about fleet vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micro-mobility fleet vehicle, as described herein.

Fleet vehicles implemented as shared micro-mobility fleet vehicles may include a variety of additional features designed to facilitate fleet management and user and environmental safety. For example, as shown in FIG. 1, fleet vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user of fleet vehicle 110. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of fleet vehicle 110 and/or other elements of system 100. For example, user interface 132 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause fleet vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to transmit control signals from user interface 132 to wireless communications module 120 or 144. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or fleet vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 100 (e.g., controller 112) to provide operational control of fleet vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, Wi-Fi, Bluetooth, ZigBee, XBee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for fleet vehicle 110, using one or more power leads. Such power leads may also be used to support one or more communication techniques between elements of system 100. In some embodiments, one or more of the components/modules illustrated in FIG. 1 may include an OTP memory and implement the key-based security features disclosed herein.

Figure 2:
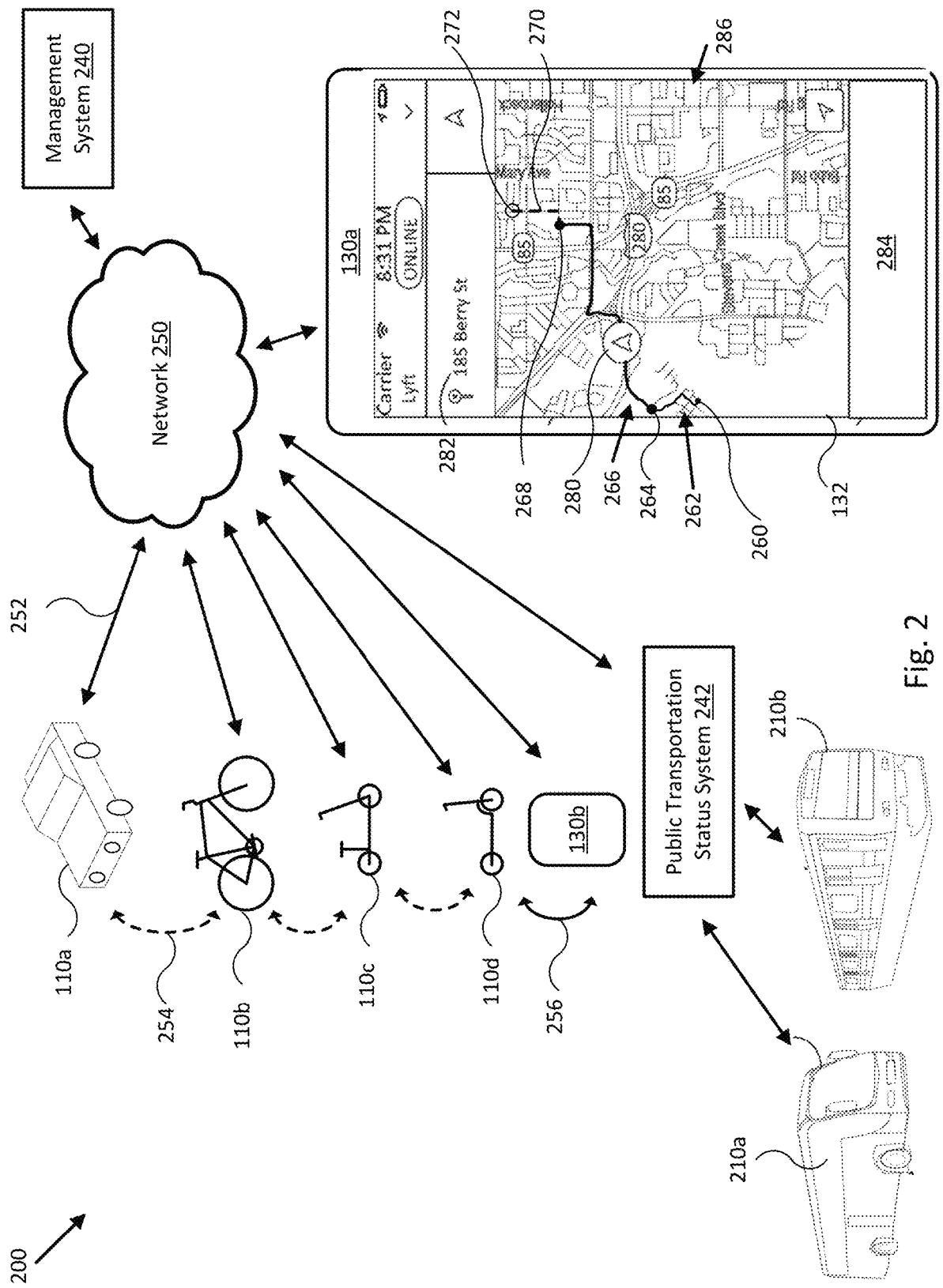
FIG. 2 illustrates a block diagram of a dynamic transportation matching system incorporating a variety of transportation modalities in accordance with an embodiment of the disclosure.

FIG. 2 illustrates a block diagram of dynamic transportation matching system 200 incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes a management system/server 240 in communication with a number of vehicle docking stations and a number of fleet vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all vehicle docking stations and fleet vehicles are able to communicate directly to WAN 250 and, in some embodiments, may be able to communicate with each other across mesh network communication links 254, to convey fleet data and/or fleet status data amongst themselves and/or to and from management system 240.

In FIG. 2, a transportation requestor may use user device 130a to hire or rent one of fleet vehicles 110a-d by transmitting a transportation request to management system 240 over WAN 250, allowing management system 240 to poll status of fleet vehicles 110a-d (e.g., a hire status, a battery charge level status, etc.) and to select one or more of fleet vehicles 110a-d to fulfill the transportation request; receive a fulfillment notice from management system 240 and/or from the selected fleet vehicle(s), and receive navigation instructions to proceed to or otherwise meet with the selected fleet vehicle. A similar process may be used by a transportation requestor using user device 130b, but where the transportation requestor is able to access a fleet vehicle over local communication link 256, as shown.

In some embodiments, each of the fleet vehicles 110a-d may be configured to determine a charge level of a battery connected to the fleet vehicle (e.g., using the sensor of the battery 124), and to transmit a signal to the management system 240 via the mesh network 260 and/or the WAN 250 to indicate the charge level of the battery or to indicate that the charge level is below a threshold (e.g., 20%, 10%, etc.). In some embodiments, each of the fleet vehicles 110a-d may be configured to also include an identifier of the fleet vehicle (e.g., a vehicle number, a serial number, etc.) and the geographical location of the fleet vehicle (e.g., the sensor information from the GNSS 118) in the signal. When the management system 240 receives the signal, the management system 240 may dispatch a person or device associated with the transportation provider (e.g., a maintenance worker, technician, mechanic, delivery person, etc.) to the location indicated in the signal to service the fleet vehicle. The location (e.g., a rental station, etc.) may include multiple fleet vehicles. As such, upon arriving at the location, the user may determine which of the fleet vehicles have low battery charge levels based on a visual indicator and/or an audio indicator presented on the battery packs or the battery compartments of the fleet vehicles and may proceed to charge and/or replace the battery packs of the fleet vehicles having low battery charge levels.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses (e.g., hire statuses (such as available for hire/use or in-use), battery charge level statuses, etc.) of vehicle docking stations and fleet vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among fleet vehicles 110a-d, as described herein.

User device 130a in FIG. 2 includes a display of user interface 132 that shows a planned route for a user attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including fleet vehicles and public transportation vehicles) and provide a planned multimodal route from origination point 260 to destination 272. Such planned multimodal route may include, for example, a walking route 262 from origination point 260 to a bus stop 264, a bus route 266 from bus stop 264 to a bus stop 268, and a micro-mobility route 270 (e.g., using one of shared micro-mobility fleet vehicles 110b, 110c, or 110d) from bus stop 268 to destination 272. Also shown rendered by user interface 132 are a present location indicator 280 (indicating a present absolute position of user device 130a on street map 286), a navigation destination selector/indicator 282 (e.g., configured to allow a user to input a desired navigation destination), and a notice window 284 (e.g., used to render fleet status data, including user notices and/or alerts, as described herein). For example, a user of fleet vehicle 110 may use navigation destination selector/indicator 282 to provide and/or change destination 272, as well as change any leg or modality of the multimodal route from origination point 260 to destination 272. In some embodiments, notice window 284 may display instructions for traveling to a next waypoint along the determined multimodal route (e.g., directions to walk to a bus stop, directions to ride a shared micro-mobility fleet vehicle to a next stop along the route, etc.).

In various embodiments, management system 240 may be configured to provide or suggest an optimal multimodal route to a transportation requester (e.g., initially and/or while traversing a particular planned route), and the transportation requester may select or make changes to such route through manipulation of user device 130a, as shown. For example, management system 240 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 200, prior user trips, a desired arrival time and/or departure time (e.g., based on user input or obtained through a user calendar or other data source), or specifically input or set by a user for the specific route, for example, or in general. In one example, origination point 260 may be extremely congested or otherwise hard to access by a ride-share fleet vehicle, which could prevent or significantly increase a wait time for the user and a total trip time to arrive at destination 272. In such circumstances, a planned multimodal route may include directing the user to walk and/or take a scooter/bike to an intermediate and less congested location to meet a reserved ride-share fleet vehicle, which would allow the user to arrive at destination 272 quicker than if the ride-share fleet vehicle was forced to meet the user at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
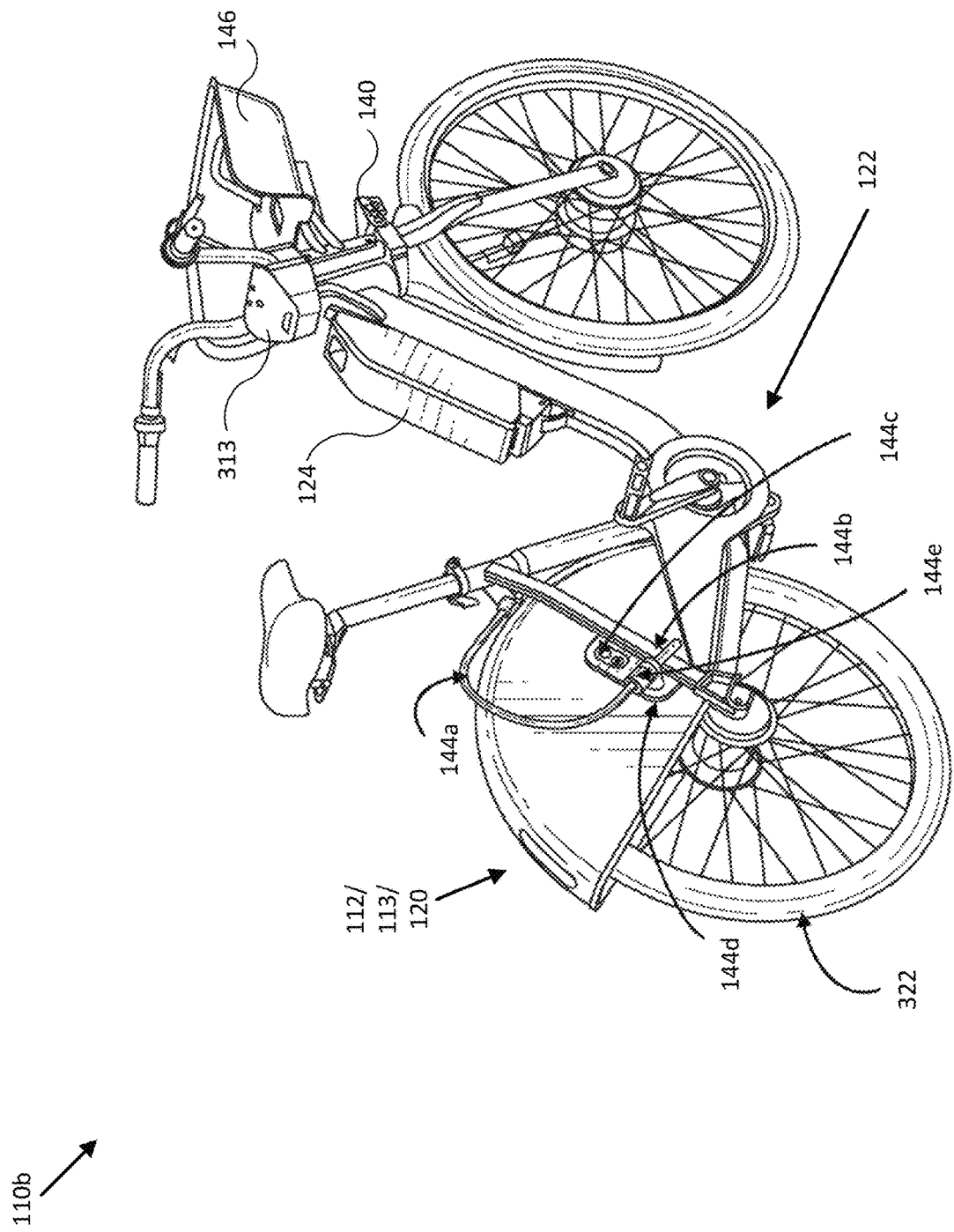
FIGS. 3A-C illustrate diagrams of shared micro-mobility fleet vehicles for use in a dynamic transportation matching system in accordance with embodiments of the disclosure.
Figure 3B:
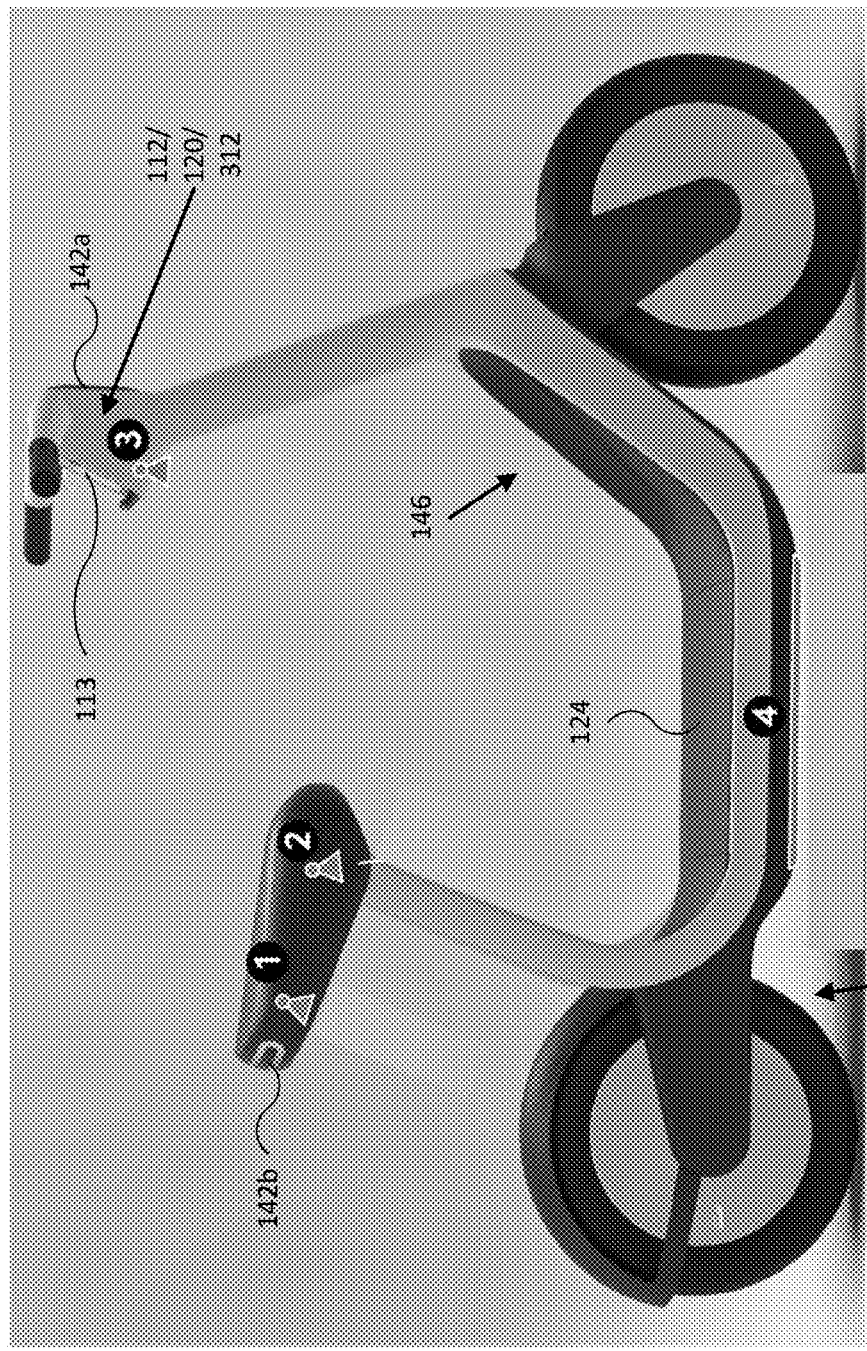
Figure 3C:
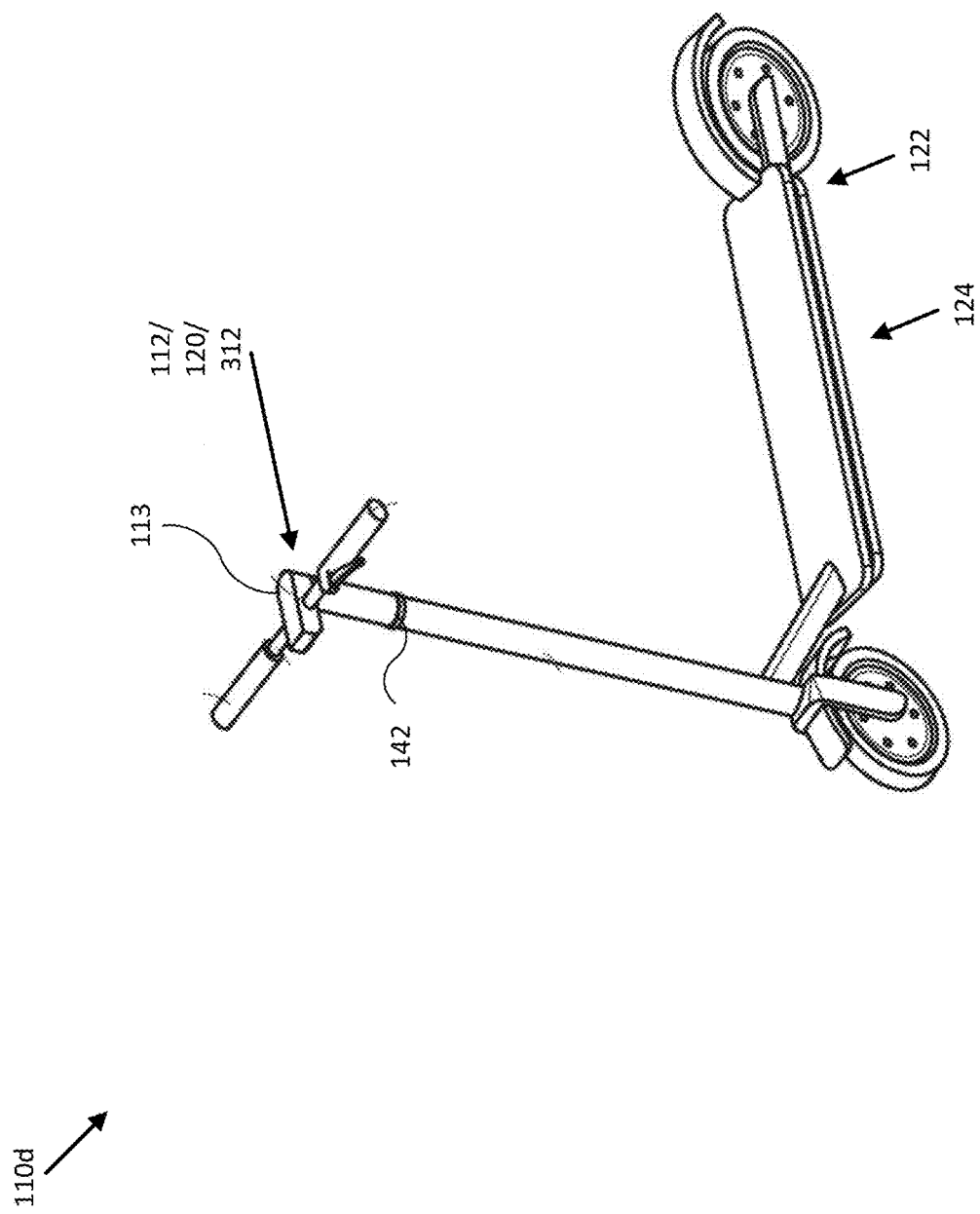

FIGS. 3A-C illustrate diagrams of shared micro-mobility fleet vehicles 110b, 110c, and 110d. For example, shared micro-mobility fleet vehicle 110b of FIG. 3A may correspond to a motorized bicycle for hire that is integrated with the various elements of system 100 and may be configured to participate in dynamic transportation matching system 200 of FIG. 2. As shown, shared micro-mobility fleet vehicle 110b includes controller/user interface/wireless communications module 112/113/120 (e.g., integrated with a rear fender of shared micro-mobility fleet vehicle 110b), propulsion system 122 configured to provide motive power to at least one of the wheels (e.g., a rear wheel 322) of shared micro-mobility fleet vehicle 110b, battery 124 for powering propulsion system 122 and/or other elements of shared micro-mobility fleet vehicle 110b, docking mechanism 140 (e.g., a spade lock assembly) for docking shared micro-mobility fleet vehicle 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilize rear wheel 322 of shared micro-mobility fleet vehicle 110b, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize shared micro-mobility fleet vehicle 110b by default, thereby requiring a transportation requester to transmit a hire request to management system 240 (e.g., via user device 130) to hire shared micro-mobility fleet vehicle 110*b* before attempting to use shared micro-mobility fleet vehicle 110*b*. The hire request may identify shared micro-mobility fleet vehicle 110*b* based on an identifier (e.g., a QR code, a barcode, a serial number, etc.) presented on shared micro-mobility fleet vehicle 110*b* (e.g., such as by user interface 113 on a rear fender of fleet vehicle 110*b*). Once the hire request is approved (e.g., payment is processed), management system 240 may transmit an unlock signal to shared micro-mobility fleet vehicle 110*b* (e.g., via network 250). Upon receiving the unlock signal, shared micro-mobility fleet vehicle 110*b* (e.g., controller 112 of shared micro-mobility fleet vehicle 110*b*) may release vehicle security device 144 and unlock rear wheel 322 of shared micro-mobility fleet vehicle 110*b*.

Shared micro-mobility fleet vehicle 110*c* of FIG. 3B may correspond to a motorized sit-scooter for hire that is integrated with the various elements of system 100 and may be configured to participate in dynamic transportation matching system 200 of FIG. 2. As shown in FIG. 3B, shared micro-mobility fleet vehicle 110*c* includes many of the same elements as those discussed with respect to fleet vehicle 110*b* of FIG. 3A. For example, shared micro-mobility fleet vehicle 110*c* may include user interface 113, propulsion system 122, battery 124, controller/wireless communications module/cockpit enclosure 112/120/312, user storage 146 (e.g., implemented as a storage recess), and operator safety measures 142*a* and 142*b*, which may be implemented as various types of headlights, programmable light strips, and/or reflective strips.

Shared micro-mobility fleet vehicle 110*d* of FIG. 3C may correspond to a motorized stand or kick scooter for hire that is integrated with the various elements of system 100 and may be configured to participate in dynamic transportation matching system 200 of FIG. 2. As shown in FIG. 3C, shared micro-mobility fleet vehicle 110*d* includes many of the same elements as those discussed with respect to fleet vehicle 110*b* of FIG. 3A. For example, shared micro-mobility fleet vehicle 110*d* may include user interface 113, propulsion system 122, battery 124, controller/wireless communications module/cockpit enclosure 112/120/312, and operator safety measures 140, which may be implemented as various types programmable light strips and/or reflective strips, as shown.

Figure 3D:
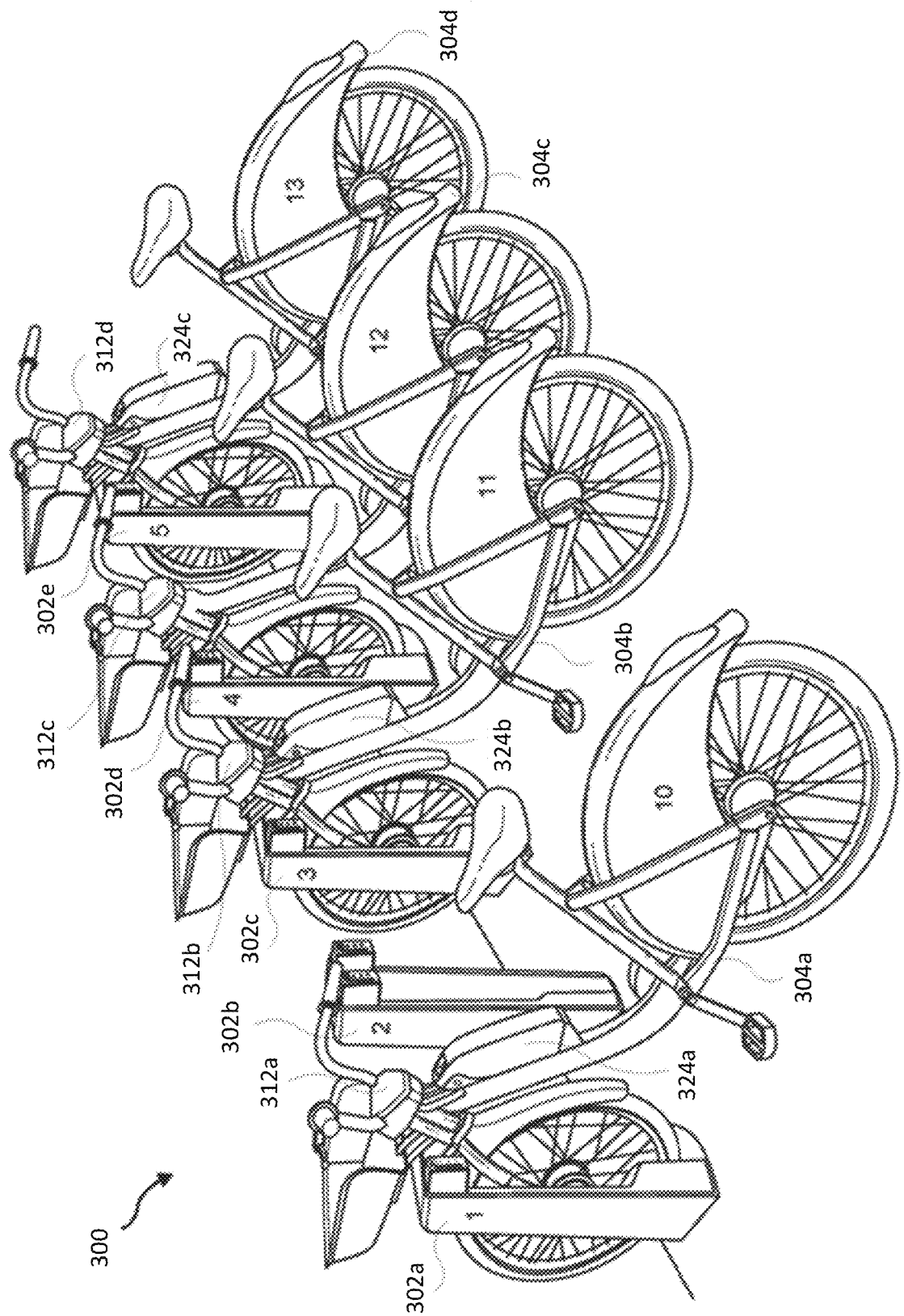
FIG. 3D illustrates a diagram of a docking station for docking fleet vehicles in accordance with an embodiment of the disclosure.

FIG. 3D illustrates a docking station 300 for docking fleet vehicles (e.g., fleet vehicles 110*c*, 110*e*, and 110*g*, etc.) according to one embodiment. As shown, docking station 300 may include multiple bicycle docks, such as docks 302*a-e*. In this example, a single fleet vehicle (e.g., any one of electric bicycles 304*a-d*) may dock in each of the docks 302*a-e* of the docking station 300. Each of the docks 302*a-e* may include a lock mechanism for receiving and locking the docking mechanism 140 of the electric bicycles 304*a-d*. In some embodiments, once a fleet vehicle is docked in a bicycle dock, the fleet vehicle is locked in place with respect to the bicycle dock, and the bicycle dock may be electronically coupled to the fleet vehicle (e.g., controllers 312*a-d* of the fleet vehicle) via a link such that the fleet vehicle and the dock may communicate with each other via the link.

A user may use a user device (e.g., user device 130) to hire a fleet vehicle that is docked in one of the bicycle docks 302*a-e* by transmitting a hire request to management system 240. Once the hire request is processed, management system 240 may transmit an unlock signal to the electric bicycle docked in the dock and/or the dock via network 250. The dock may automatically unlock the lock mechanism to release the electric bicycle based on the unlock signal. In some embodiments, each of the docks 302*a-e* may also be configured to charge batteries (e.g., batteries 324*a-c*) of the electric bicycle 304*a-d*, respectively, when the electric bicycle 304*a-d* are docked at the docks 302*a-e*. In some embodiments, docking station 300 may also be configured to transmit information associated with the docking station 300 (e.g., a number of fleet vehicles docked at the docking station 300, charge statuses of the docked fleet vehicles, etc.) to the management system 240.

Figure 4:
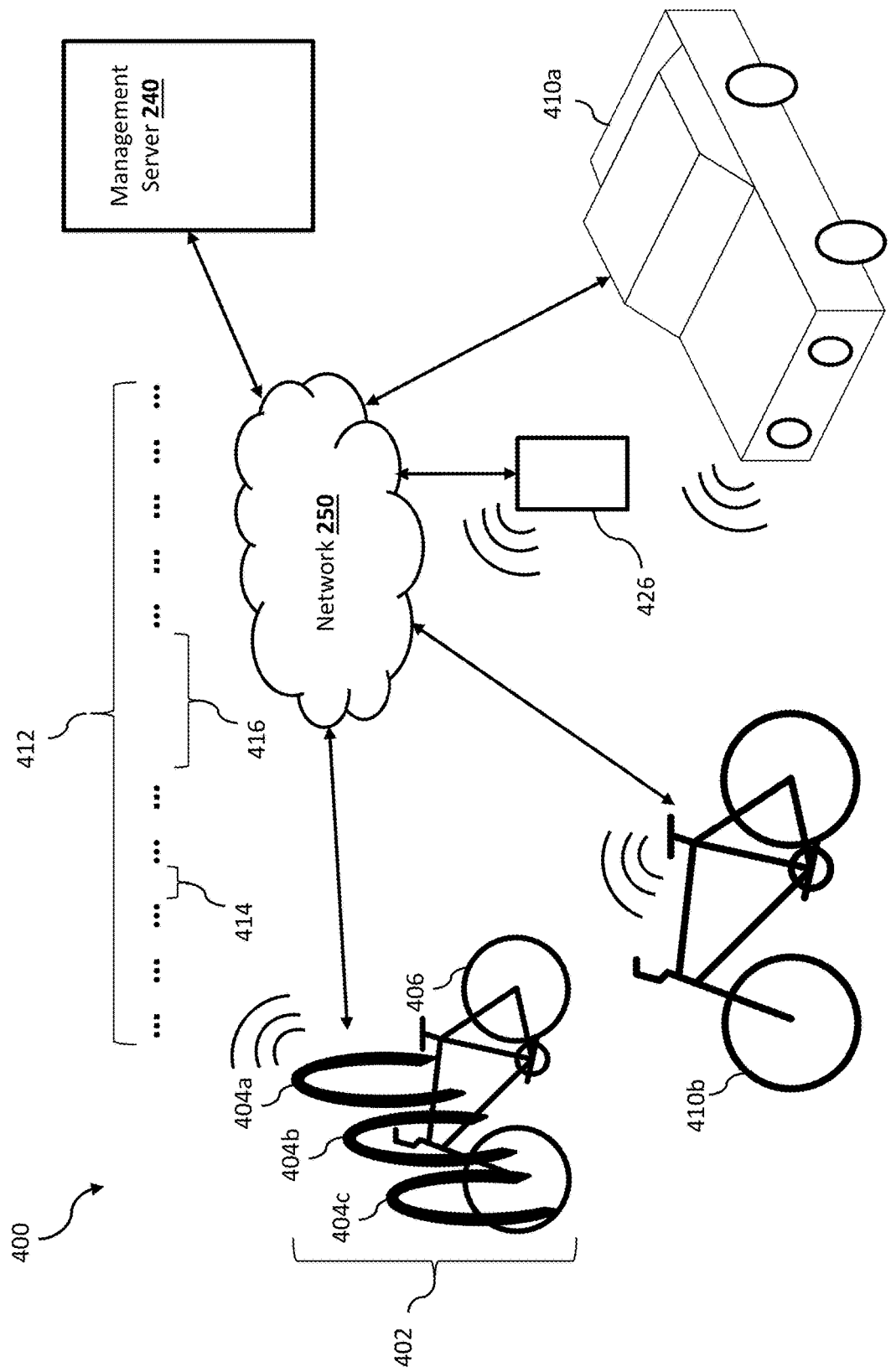
FIG. 4 illustrates a micro-mobility vehicle sharing system for facilitating communication between a shared micro-mobility fleet vehicle docking station and a management server in accordance with an embodiment of the disclosure.

FIG. 4 illustrates a micro-mobility fleet vehicle sharing system 400 that implements the communication and security features as described herein. As shown, a vehicle docking station 402 is in communication with a management server 240 over the network 250. While only one vehicle docking station is shown in this figure, it has been contemplated that multiple vehicle docking stations may be simultaneously connected with the management server 240, and each of the vehicle docking stations may be similar to the vehicle docking station 402 and may implement the same communication and security features as described herein. The vehicle docking station 402 includes multiple docks 404*a*-404*c*. In some embodiments, the vehicle docking station 402 may be implemented as the docking station 300 and each of the docks 404*a*-404*c* may be implemented as one of the dock 302*a*-302*e* as illustrated in FIG. 3D. Each of the docks 404*a*-404*c* allows a shared micro-mobility fleet vehicle to dock (e.g., to be received and locked at a dock of the vehicle docking station 402). For example, a shared micro-mobility fleet vehicle 406 (e.g., an electric bicycle) is shown to have docked at the dock 404*c* of the vehicle docking station 402. In some embodiments, the shared micro-micro-mobility fleet vehicle 406 may be implemented as the shared micro-mobility fleet vehicle 110*b* illustrated in FIG. 3A. In some embodiments, when a shared micro-mobility fleet vehicle is docked at one of the docks 404*a*-404*c*, the docking mechanism 140 of the shared micro-mobility fleet vehicle may come in contact with a locking mechanism of the dock, which may secure (e.g., lock) the shared micro-mobility fleet vehicle to the dock. The locking mechanism of the dock 404*c* may also obtain an identifier (e.g., a serial number) from the docking mechanism 140 of the shared micro-mobility fleet vehicle 406 after successfully securing the shared micro-mobility fleet vehicle 406 to the dock 404*c*, such that the vehicle docking station 402 may generate a log entry for docking the shared micro-mobility fleet vehicle 406, which may include a time of docking the shared micro-mobility fleet vehicle 406 and an identifier of the shared micro-mobility fleet vehicle 406.

In some embodiments, the vehicle docking station may include a communication module for communicating with the management server 240 over the network 250. For example, the communication module may include a wireless transmitter for communicating with the management server 204 via a cellular network. In some embodiments, the vehicle docking station may establish and maintain a communication session (e.g., a TCP/IP communication session) with the management server 240. Through the communication session, the vehicle docking station 402 may transmit updated information (also referred to as docking station data) associated with the vehicle docking station 402, such as an operating status of the vehicle docking station 402, identities (and a number) of the shared micro-mobility fleet vehicles docked at the vehicle docking station (e.g., such as the log entry for the shared micro-mobility fleet vehicle 406), a charge status(es) of one or more of the shared micro-mobility fleet vehicles (e.g., the shared micro-mobility fleet vehicle 406) docked at the vehicle docking station 402, information indicating physical condition(s) of the shared micro-mobility fleet vehicles (e.g., the shared micro-mobility vehicle shared 406) docked at the vehicle docking station 402, network information associated with the vehicle docking station 402, battery information associated with the vehicle docking station 402, and other information of the vehicle docking station 402 may be transmitted by the vehicle docking station to the management server 240 (e.g., on a periodic basis).

In some embodiments, the management server 240 may use the information obtained from the various vehicle docking stations (e.g., the vehicle docking station 402) to manage and facilitate the micro-mobility vehicle sharing service. For example, based on the information obtained from the vehicle docking station 402, the management server 204 may determine that the shared micro-mobility fleet vehicle 406 is available for hire. Upon receiving a hiring request from a transportation requester for the shared micro-mobility fleet vehicle 406, the management server 240 may transmit an unlock signal to the shared micro-mobility fleet vehicle 406 and/or the vehicle docking station 402 for unlocking the shared micro-mobility fleet vehicle 406. Based on the unlock signal received from the management server 240, the vehicle docking station 402 may operate the locking mechanism associated with the dock 404c to unlock the shared micro-mobility fleet vehicle 406c.

A communication session such as a TCP/IP communication session may be automatically closed when there is inactivity (e.g., no data transmitted over the communication session) for a time duration. As such, in order to maintain the communication session (e.g., to keep the communication session alive, to prevent a network service provider from closing a TCP socket, etc.), the vehicle docking station 402 may be configured to transmit heartbeat signals (e.g., the heartbeat signals 412) to the management server 240 via the communication session. The heartbeat signals 412 may be signals that the vehicle docking station 402 periodically transmits to the management server 240 at a predetermined frequency or interval (e.g., every 5 seconds, every minute, every 10 minutes, etc.). In this example, the vehicle docking station 402 may be configured to transmit the heartbeat signals 412 at an interval having a rest period 414, such that the vehicle docking station 402 is configured to wait (e.g., hold) for a time period associated with the rest period 414 between transmissions of the heartbeat signals 412. In some embodiments, when the management server 240 receives a heartbeat signal from the vehicle docking station 402, the management server 402 may be configured to respond with an acknowledgement signal to acknowledge to the vehicle docking station 402 the receipt of the heartbeat signal.

As discussed herein, through the communication session, the vehicle docking station 402 may transmit docking station data to the management server 240, and the management server 204 may transmit instructions (e.g., unlock instructions) to the vehicle docking station 402. In some embodiments, the docking station data is transmitted to the management server 240 separately from the heartbeat signals, for example, during the resting period 414 in between transmissions of the heartbeat signals. In other embodiments, the docking station data may be embedded within the heartbeat signals 412, such that information associated with the vehicle docking station 402 can be communicated to the management server 204 via the heartbeat signals 412. One benefit of embedding the docking station data into the heartbeat signals is that it increases the functionality of the heartbeat signals, such that the heartbeat signals not only indicate the availability of the vehicle docking station 402, but also relay additional information associated with the vehicle docking station 402 to the management server 240. In some embodiments, all of the docking station data (e.g., all of the information associated with the vehicle docking station for transmitting to the management server) can be embedded into each heartbeat signal 412 as a package and transmitted to the management server 240 at the predetermined frequency (e.g., every 5 seconds, every 1 minute, etc.). Thus, at each interval, the vehicle docking station 402 may obtain updated data (e.g., retrieving identities of the docked vehicles, retrieving charged status(es) of the docked vehicles, obtaining battery status of the docking station, etc.), may encapsulate the docking station data into a heartbeat signal according to a predetermined format, and may transmit the heartbeat signal to the management server 240.

In some other embodiments, especially when the frequency of the heartbeat signals 412 is sufficiently high, the docking station data may be divided into multiple portions, and different heartbeat signals may carry different portions of the docking station data for transmitting to the management server 240. For example, when the docking station data is divided into five different portions, the vehicle docking station 402 may embed one of the five different portions into each heartbeat signal. Thus, at a first interval, the vehicle docking station 402 may obtain a first portion of the docking station data, embed the first portion of the docking station data into a first heartbeat signal, and transmit the first heartbeat signal to the management server 240. At a second interval, the vehicle docking station 402 may obtain a second portion of the docking station data, embed the second portion of the docking station data into a second heartbeat signal, and transmit the second heartbeat signal to the management server 240.

The vehicle docking station 402 may continue to embed different portions of docking station data in different heartbeat signals for transmitting to the management server 240. After obtaining a fifth portion of the docking station data, embedding the fifth portion of the docking station data into a fifth heartbeat signal, and transmitting the fifth heartbeat signal to the management server 240, the vehicle docking station 402 may begin the cycle again by obtaining updated information associated with the first portion of the docking station data and transmitting the first portion of docking station data in a heartbeat signal (e.g., a sixth heartbeat signal) to the management server 240.

In some embodiments, the order of the docking station data being received by the management server 240 is important. For example, data related to state changes of the vehicle docking station 402 (e.g., from an inactive state to an active state and back to the inactive state, etc.) must be processed in the correct order so that the management server 240 can have the most up-to-date information for the vehicle docking station 402 based on the latest state information received from the vehicle docking station 402. The complexity of the solution comes from the need to support: (1) delayed state information that is stored at the vehicle docking station 402 when the connection with the management server 240 is unavailable, and live state information that should not be overridden when the delayed station information is finally received by the management server 240; (2) unreliable heartbeat clocks that indicate a wrong time before a successful synchronization with the management server 240, thus making it unreliable to use times the determine an ordering of the state information; (3) multiple service instances that may receive live state information in an order that is not chronological; and (4) computer hardware (e.g., electrical boards, etc.) that are often swapped between vehicle docking stations, bringing along stored docking station data from the previous vehicle docking station, that should not be processed by the current vehicle docking station.

One solution to address the issues is to use multiple message queues. For example, each vehicle docking station may include two persisted message queues: one with adjusted sequence number (AMQ) and the other one with unadjusted sequence number (UMQ). During a power-up (e.g., boot up) of a vehicle docking station, messages are added only to the UMQ. These messages are not transmitted live (e.g., not in real-time), with their delayed flag set to true. When the connection with the management server 240 becomes available (or until the docking station can complete the process), the vehicle docking station can process the messages in the UMQ based on the following process: (1) calls the station service's gRPC getBootConfig; (2) if the call fails, wait for 10 seconds and try again; (3) receives a bootConfig that contains the last_received_sequence_number; (4) if the last_sequence_number<=last AMQ number, last_sequence_number=last AMQ number; and (5) moves the UMQ messages to AMQ and changes their sequence number incrementally starting at last_sequence_number+1. At the end of the process, the UMQ is empty and no new messages are added during the app running instance.

In some embodiments, AMQ messages are sent/unpersisted in the background. The vehicle docking station may send new messages using the incremental sequence number, and persisted messages are added to the AMQ only.

The management server 240 may perform the following: (1) keeps track of the greatest sequence number of any message sent by each vehicle docking station; (2) returns that sequence number in the response to the getBootConfig gRPC call; (3) keeps track of the greatest sequence number per "asset"; and (4) updates asset state if and only if a message about that asset is greater than its associated stored number. The management server 240 may determine an updated time of the asset as follows: if the message is live, the updated time is the reception time; however, if the message delayed, the updated time is the creation time.

In some embodiments, when a vehicle docking station determines that a new hardware (e.g., a tag identifier stored on the hardware does not correspond to an identifier of the vehicle docking station) has been installed on the vehicle docking station, the vehicle docking station will delete all messages in the queues (both AMQ and UMQ). When a vehicle docking station does not recognize a hardware (e.g., cannot detect a tag identifier of a hardware), the vehicle docking station does not store any message in the UMQ during a power-up.

In an example scenario where a vehicle docking station does not recognize a hardware during a power-up, the vehicle docking station may send an error message indicating that the hardware ware is not recognized to the management server 240, and will not send or store any messages in the message queues. In another scenario where a hardware is moved from a vehicle docking station to another vehicle docking station: Hardware '1' is removed from Station 'A', Hardware '2' is installed on Station 'A', Station 'A' using Hardware '2' to connect to the management server 240; Hardware '1' is installed on Station 'B' without tag information associated with Station 'A'; Hardware '1' powers up without connecting Station 'B' to the management server 240, Hardware '1' reads cached docking station data associated with Station 'A'; Hardware '1' sends a message to the management server 240 indicating that Station 'A' boots without Tag, which raises an alarm at the management server 240 since the management server is already connected to Station 'A'.

In an alternative embodiment, each vehicle docking station may only store one message queue of delayed messages. At power-up time, new messages are sent live by the vehicle docking station. If the transmission of the messages fails, the vehicle docking station may store the messages in the queue with their delayed flag set to true. The message sequence number is twofold: a persisted boot index (BI) and a message index (MI). The vehicle docking station may send the delayed messages in the background, and may send new messages using the incremental MI. At each power-up, the persisted BI is used for the current power-up, and then incremented and stored for the next power-up. The vehicle docking station may reset the BI upon detecting new hardware (e.g., based on the tag identifier of the hardware), and sends a reset BI message to the management server 240.

The management server 240 may (1) keep track of the greatest sequence number per "asset"; (2) upon receiving a reset message from the vehicle docking station, reset sequence numbers of all assets; and (3) update asset state if and only if a message about that asset is greater than its associated stored number. The management server 240 may determine the updated time of the asset as follows: if the message is live, the updated time is the reception time of the message; if the message is delayed, the updated time is the creation time.

A vehicle docking station that boots and recognizes that there is a new hardware (e.g., based on tag identifier), the vehicle docking station may delete its queue of messages and send log information about it to the management server 240. The vehicle docking station may also send a reset message to the management server 240 and reset the persisted boot index to zero.

Figure 5:
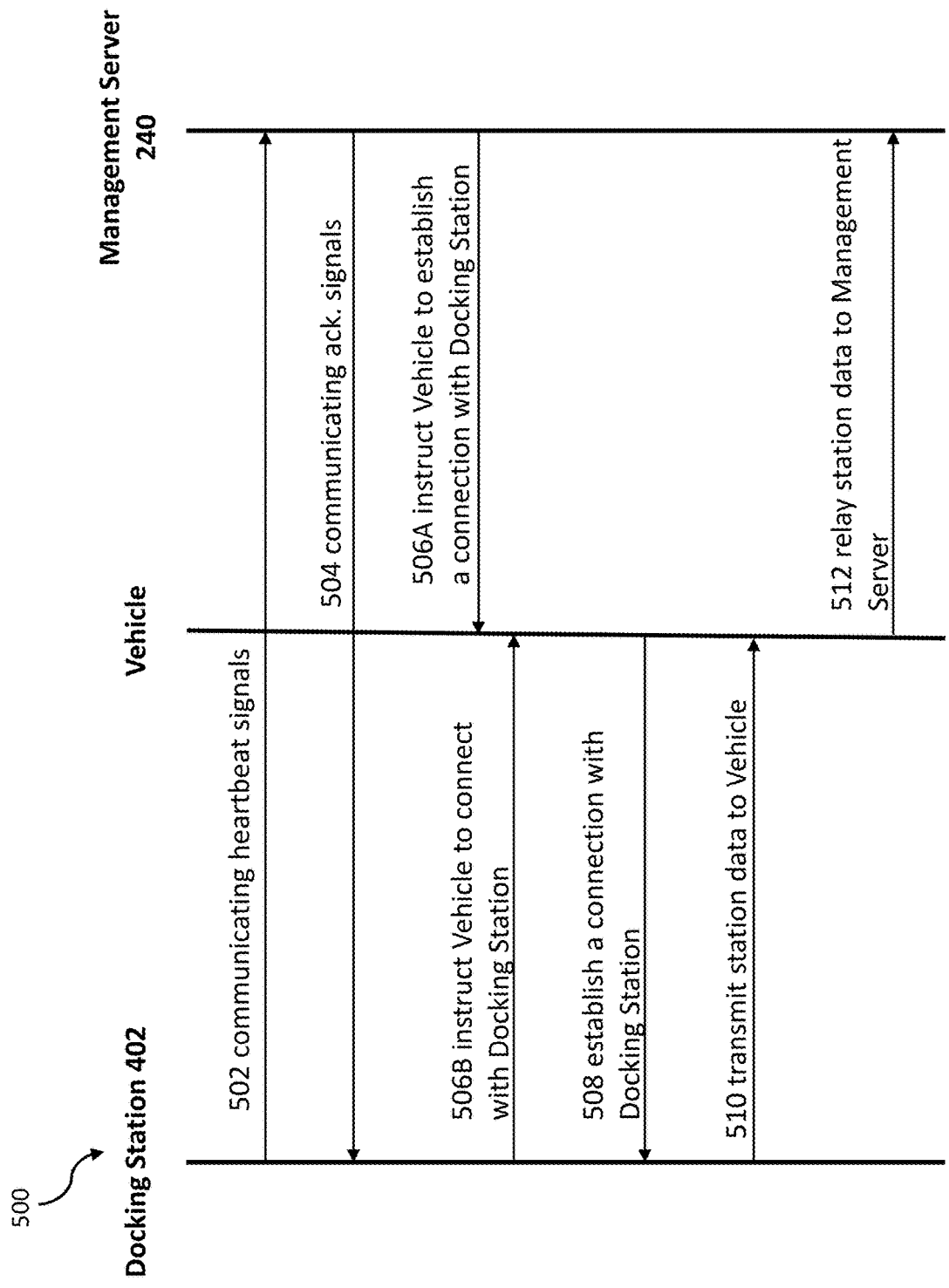
FIG. 5 illustrates communication among a shared micro-mobility fleet vehicle docking station, a management server, and a shared micro-mobility fleet vehicle for establishing an alternate route for communication between the shared micro-mobility fleet vehicle docking station and the management server in accordance with an embodiment of the disclosure.

FIG. 5 illustrates an exemplary communication sequence 500 for establishing an alternative communication channel between the vehicle docking station 402 and the management server 240. When the vehicle docking station 402 operates under normal conditions, the vehicle docking station 402 may establish and/or maintain a communication session (e.g., a TCP/IP communication session) with the management server 240. For example, in order to maintain the communication session, the vehicle docking station 402 may transmit heartbeat signals (e.g., the heartbeat signals 412) to the management server 240 via the communication session, during the step 502. In response to receiving the heartbeat signals, the management server 240 may also transmit acknowledgement signals indicating the receipt of the heartbeat signals back to vehicle docking station 402 in the step 504. In some embodiments, each acknowledgement signal may correspond to a particular heartbeat signal. For example, each heartbeat signal transmitted by the vehicle docking station 402 may include an identifier (e.g., a timestamp corresponding to the heartbeat signal). Upon receiving a heartbeat signal, the management server 240 may generate an acknowledgement signal that includes the identifier of the heartbeat signal, such that the acknowledgement signal may indicate, to the vehicle docking station, a confirmation of receipt of the particular heartbeat signal by the management server 240.

Due to the physical location of the vehicle docking station 402, the connection between the vehicle docking station 402 and the management server 240 may not be stable all the time. For example, factors such as weather conditions, physical obstructions (e.g., a tree, a truck that is parked near the vehicle docking station, a building, etc.) or other factors may affect the strength and the availability of a connection between the vehicle docking station 402 and a nearby wireless transmitter (e.g., a base station, a Wi-Fi access point, etc.), for connecting to the management server 240. For example, the heartbeat signals 412 may be interrupted during the period 416 in FIG. 4, in which no heartbeat signals are received by the management server 240. Thus, according to various embodiments of the disclosure, the management server 240 and/or the vehicle docking station 402 may be configured to determine an interruption (e.g., a temporary unavailability) of a connectivity (e.g., the communication connection) between the management server 240 and the vehicle docking station 402 based on detecting an interruption to the heartbeat signals 412 and/or the acknowledgment signals. Detecting when an interruption occurs can be based on various factors, including length of time without receiving a heartbeat signal, which can be absolute or dependent upon the frequency of expected reception of a heartbeat signal or the length of the resting period. In response to detecting an interruption of the connectivity, the management server 240 and/or the vehicle docking station 402 may establish an alternative means of communication to maintain the communication between the vehicle docking station 402 and the management server 240.

In some embodiments, the management server 240 may monitor the heartbeat signals 412 transmitted by the various vehicle docking station 402. As discussed above, the heartbeat signals 412 are transmitted from the vehicle docking station 402 to the management server 240 according to a predetermined frequency (e.g., a predetermined interval 414). When the management server fails to receive a heartbeat signal from a vehicle docking station after the predetermined interval 414 (or when the management server fails to receive a pre-determined number of heartbeat signals (e.g., 2, 5, 8, etc.) within a time frame), the management server 240 may determine that the connectivity with the vehicle docking station 402 has been interrupted. For example, the management server 240 may not receive any heartbeat signals from the vehicle docking station 402 during the time period 416. Thus, during the time period 416, the management server 240 may determine that, after a period of time (e.g., the resting period 414) has passed since the last heartbeat signal was received from the vehicle docking station 402, the connectivity with the vehicle docking station 402 is interrupted (e.g., has become unavailable). In response to determining that the connectivity with the vehicle docking station 402 is interrupted, the management server 240 may determine an alternate means to communicate with the vehicle docking station 402 to maintain constant communication with the vehicle docking station 402.

In some embodiments, the management server 240 may determine a vehicle, such as a micro-mobility vehicle, a ride-sharing car, a public transportation vehicle, etc.) that is within a distance threshold (e.g., a range of a wireless short-range communication technology, such as Bluetooth®, etc.) from the vehicle docking station 402, based on a detected location of the vehicle. In one example, the management server 240 may determine another shared micro-mobility fleet vehicle (e.g., shared micro-mobility fleet vehicle 410*b*) that is within the distance threshold from the vehicle docking station 402. The shared micro-mobility fleet vehicle 410*b* may be approaching the vehicle docking station 420 for docking, or may just be passing by. In some embodiments, the shared micro-micro-mobility fleet vehicle 410*b* may be implemented as the shared micro-mobility fleet vehicle 110*b* illustrated in FIG. 3A. In another example, the management server 240 may determine a vehicle (e.g., a car 410*a*) that is within the distance threshold from the vehicle docking station 402 (e.g., the car 410*a* may be a ride-sharing vehicle associated with the management server 240 and is or will be passing by the vehicle docking station 402). In yet another example, the management server 240 may determine a public transportation vehicle (e.g., a bus, a taxi, etc.) that is associated with (or in communication with) the management server 240 and is or will be passing by the vehicle docking station 402.

Alternatively, in some embodiments, the vehicle docking station 402 may also monitor the acknowledge signals transmitted from the management server 240 in response to the heartbeat signals 412 and may detect one or more missing acknowledgement signals. As discussed above, each acknowledgement signal may correspond to a particular heartbeat signal. Thus, for each heartbeat signal that the vehicle docking station 402 transmits to the management server 240, the vehicle docking station 402 may monitor a receipt of a corresponding acknowledgement signal from the management server 240. When the vehicle docking station 402 fails to receive a corresponding acknowledgement signal from the management server 240 (or fails to receive a predetermined number (e.g., 2, 5, 8, etc.) of acknowledgement signals) after a time threshold from sending the heartbeat signal(s) (e.g., 2 seconds, 5 seconds, etc.), the vehicle docking station 402 may determine that the connection between the vehicle docking station 402 and the management server 240 has been interrupted (e.g., has become unavailable). In response to determining that the connection between the vehicle docking station 402 and the management server 240 is interrupted, the vehicle docking station 402 may detect any nearby vehicles, such as any shared micro-mobility fleet vehicle that is docked at the vehicle docking station, a vehicle (e.g., a shared micro-mobility fleet vehicle 410*b*, a ride-sharing car 410*a*, a public transportation vehicle, etc.) that is within a distance threshold from the vehicle docking station 402. The vehicle docking station 402 may establish a connection (e.g., a short-range wireless connection such as a Bluetooth® connection, an infrared connection, a radio-frequency communication channel, etc.) with the detected vehicle.

Since the vehicle (e.g., the shared micro-mobility fleet vehicle 410*b*, the car 410*a*, the public transportation vehicle, etc.) may communicate with the management server 240 using a different connection than the vehicle docking station 402 (e.g., a different cellular carrier, a different wireless communication technology, etc.), the connection between the vehicle and the management server may not be affected by the condition that has affected the connection between the vehicle docking station 402 and the management server 240. Thus, in step 506A, the management server 240 may transmit a signal to the vehicle (e.g., the shared micro-mobility fleet vehicle 410*b*, the car 410*a*, the public transportation vehicle, etc.) to instruct the vehicle to establish a connection (e.g., a short-range wireless connection such as a Bluetooth® connection, an infrared connection, a radio-frequency communication channel, etc.) with the vehicle docking station 402. The management server 240 may also instruct the vehicle to obtain docking station data from the vehicle docking station 402 and relay the docking station data to the management server 240.

Alternatively, when the vehicle docking station 402 fails to receive an expected acknowledgment signal from the management server 240 over a certain time period and determines connection has been lost, the vehicle docking station 402 may send a signal instructing a nearby vehicle (the same as the above nearby vehicles) to connect with the vehicle docking station 402, in step 506B.

In step 508, following step 506A or step 506B, the vehicle may establish a connection (e.g., a short-range wireless connection) with the vehicle docking station 402. For example, as discussed above, each micro-mobility vehicle may include one or more wireless communications modules 120 that are able to communicate with other devices using a wireless communication technology. In some embodiments, at least some of the components of a shared micro-mobility fleet vehicle (e.g., the vehicle controller 112, the propulsion system 122, the battery 124, etc.) may each include a wireless communication module for communicating with other devices (e.g., a vehicle docking station, other micro-mobility vehicles, etc.) using a wireless communication technology. Thus, any one of these components of the vehicle may be used to establish the connection with the vehicle docking station 402. The vehicle may then transmit a request for docking station data to the vehicle docking station 402 via the established connection.

After step 508, the vehicle docking station 402 may begin transmitting up-to-date or real-time docking station data to the vehicle in step 510, and instruct the vehicle to relay the docking station data to the management server 240. In some embodiments, the vehicle docking station 402 may embed the docking station data in one or more heartbeat signals and transmit the docking station data to the management server 240 via the vehicle in one or more heartbeat signals. In another embodiment, the vehicle docking station 402 may instruct the vehicle to obtain docking station data from the vehicle docking station 402, such that the vehicle pulls data from the vehicle docking station 402 as opposed to the vehicle docking station sending the data. Regardless of how the vehicle obtains the data, the vehicle may, in turn, relay the docking station data (and/or the heartbeat signals) to the management server 240 in step 512.

By relaying the docking station data via an intermediate vehicle to the management server 240, the management server 240 may continue to receive updated docking station data from the vehicle docking station 402 while the direct connection with the vehicle docking station 402 is temporarily unavailable. While the vehicle docking data is being transmitted to the management server 240 via the vehicle, the vehicle docking station 402 may continue to attempt to transmit the heartbeat signals 412 to the management server 240 through the direct connection. One or both of the vehicle docking station 402 and the management server 240 may continue to monitor the connectivity between the management server 240 and the vehicle docking station 402 based on whether they can receive the acknowledgement signals or the heartbeat signals, respectively. In some embodiments, the management server 240 may continue to instruct the vehicle to obtain docking station data from the vehicle docking station 402 and/or the vehicle docking station may continue to transmit updated docking station data to the management server 240 via the vehicle (e.g., periodically) until a detection of the following condition: either (1) the connection between the vehicle docking station 402 and the management server 240 has been restored (e.g., the management server 240 begins receiving the heartbeat signals from the vehicle docking station 402 again, or the vehicle docking station 402 begins receiving corresponding acknowledgement signals from the management server 240) or (2) the wireless short-range connection between the vehicle and the vehicle docking station 402 becomes unavailable (e.g., the vehicle has moved outside of the operational range of a wireless transmitter, etc.).

When the management server 240 and/or the vehicle docking station 402 determines that the wireless short-range connection between the vehicle and the vehicle docking station 402 becomes unavailable, the management server 240 and/or the vehicle docking station 402 may detect another vehicle (e.g., a second vehicle) that is within the distance threshold from the vehicle docking station 402 and instruct the second vehicle to obtain and relay docking station data from the vehicle docking station 402 to the management server 240. The vehicle docking station 402 may continue to transmit updated docking station data to the management server 240 via an intermediate vehicle using the techniques described herein until the direct connection between the vehicle docking station 402 and the management server 240 is restored. When it is determined that the direct connection between the vehicle docking station 402 and the management server 240 is restored, the vehicle docking station 402 may revert back to transmitting the docking station data to the management server 240 directly using the communication session between the vehicle docking station 402 and the management server 240.

Through relaying docking station data via one or more vehicles, the management server 240 may access docking station data from the various vehicle docking stations (e.g., the vehicle docking station 402) even when the connection with one or more vehicle docking station becomes unavailable. Thus, the management server 240 may determine the statuses of the vehicles in real-time without interruptions. For example, the management server 240 may determine whether a vehicle has been returned to the vehicle docking station 402 (e.g., the shared micro-mobility fleet vehicle 410b that is approaching the vehicle docking station 402) and may be able to charge an amount to a user account based on an accurate time of returning the vehicle to the vehicle docking station 402. The management server 204 may also transmit instructions to unlock one or more shared micro-mobility fleet vehicles that are docked at the vehicle docking station 402 via the intermediate vehicle, based on a request to hire the one or more shared micro-mobility fleet vehicles.

Furthermore, the management server 240 and/or the vehicle docking station 402 may detect any tampering of a shared micro-mobility fleet vehicle through the short-range connection established between the shared micro-mobility fleet vehicle and the vehicle docking station 402. As discussed above, a malicious user may tamper with a shared micro-mobility fleet vehicle by removing (e.g., and replacing) one or more components (e.g., the vehicle controller 112, a motor controller of the propulsion system 122, a battery module of the battery 124, etc.) from the shared micro-mobility fleet vehicle. Thus, in another aspect of the disclosure, a security mechanism may be provided to shared micro-mobility fleet vehicles of the micro-mobility vehicle sharing service to enhance security of the shared micro-mobility fleet vehicles. In some embodiments, some of the components (e.g., the vehicle controller 112, a motor controller of the propulsion system 122, a battery module of the battery 124) of a micro-mobility vehicle may each include a one-time programmable (OTP) memory. An OTP memory is a type of read-only memory (ROM), that once data is written on the OTP memory, the data is stored permanently and cannot be modified. FIG. 6 illustrates the security mechanisms implemented within a shared micro-mobility fleet vehicle 610b according to one embodiment of the disclosure. The shared micro-mobility fleet vehicle 610b may include a vehicle controller 612 (also referred to as an Internet-of-things (IOT) module), a motor controller 622 for controlling a propulsion system (e.g., an electric motor) of the shared micro-mobility fleet vehicle 610b, and a battery module 624 for controlling a battery pack of the shared micro-mobility fleet vehicle 610b.

When the shared micro-mobility fleet vehicle 610b is powered up for the first time after being released from a factory, the shared micro-mobility fleet vehicle 610b may be configured to provide current sufficient to only power up the vehicle controller 612 for transmitting a provisioning signal to the management server 240, but not sufficient to power the propulsion system and/or other components of the shared micro-mobility fleet vehicle 610b. The provisioning signal may include an identifier (e.g., a serial number) of the shared micro-mobility fleet vehicle 610b.

When the management server 240 receives the provisioning signal, the management server 240 may determine a key (e.g., a primary key such as key 632) for the shared micro-mobility fleet vehicle 610b. In some embodiments, the key 632 determined for each shared micro-mobility fleet vehicle may be different such that they are unique from each other. For example, the key 632 may be determined based at least in part on the identifier of the shared micro-mobility fleet vehicle, such as a hashed key that is generated by hashing the identifier of the shared micro-mobility fleet vehicle 610b using a particular hashing function. In some embodiments, the key 632 is a 128-bit encryption key generated based at least in part on the identifier of the shared micro-mobility fleet vehicle 610b. The management server 240 may transmit the key 632 to the shared micro-mobility fleet vehicle 610b, as a response to the provisioning signal. Once the key 632 is received, the vehicle controller 612 of the shared micro-mobility fleet vehicle may store the key 632 in its OTP memory. In subsequent operations of the shared micro-mobility fleet vehicle 610b, the vehicle controller 612 is configured to power and/or unlock other components (e.g., the propulsion system, the battery module, other components, etc.) of the shared micro-mobility fleet vehicle 610b only upon receiving the key 632 from the management server. Thus, to unlock the shared micro-mobility fleet vehicle 610b (e.g., when the management server 240 has received a hiring (reservation) request from a user for hiring the shared micro-mobility fleet vehicle 610b, etc.), the management server 240 may transmit an unlock signal that includes a key (e.g., the key 632) to the shared micro-mobility fleet vehicle 610b. Upon receiving the unlock signal, the vehicle controller 612 of the shared micro-mobility fleet vehicle 610b may determine whether the key included in the unlock signal matches the key stored in its OTP memory. If the two keys match, the vehicle controller 612 may power and/or unlock the other components of the shared micro-mobility fleet vehicle 610b.

In some embodiments, in addition to the vehicle controller 612, at least some of the other components of a shared micro-mobility fleet vehicle 610b (e.g., motor controller 622, the battery module 624, etc.) may also include their own OTP memories for storing their respective keys. For example, after receiving the key from the management server 240, the vehicle controller 612 may transmit a key to at least some of the components of the shared micro-mobility fleet vehicle 610b. The key that is transmitted to the other components may be the same key (e.g., the primary key) that was received from the management server 240. Alternatively, the vehicle controller 612 may generate a different key (e.g., a secondary key such as the key 634) for the other components (e.g., another encryption key generated based at least in part on the identifier of the micro-mobility vehicle, etc.), and transmit the secondary key 634 to the other components. The components may store the key 634 in their respective OTP memories. Each of those components may be configured to be activated only after the key 634 is received. For example, after receiving the key 632 (e.g., the primary key) from the management server 240, the vehicle controller 612 may transmit the primary key (or the secondary key 634) to the other components of the shared micro-mobility fleet vehicle 610b for powering and/or unlocking the other components.

By using the key-based unlocking process, in order to unlock (e.g., activate) the shared micro-mobility fleet vehicle 610b (e.g., to operate the shared micro-mobility fleet vehicle 610b), the vehicle controller 612 of the shared micro-mobility fleet vehicle 610 must first receive the correct key from the management server 240, and the other components of the shared micro-mobility fleet vehicle 610b must receive their corresponding keys from the vehicle controller 612. Thus, a malicious user may not be able to take over the shared micro-mobility fleet vehicle 610b by simply removing the vehicle controller 612 from the shared micro-mobility fleet vehicle 610b—without the vehicle controller 612 providing the corresponding key(s) to the other components, the other components would not operate. Furthermore, since multiple components require the key to operate, removing and/or replacing one or two components with generic versions of the components (e.g., without the key-based security measures) would not render the shared micro-mobility fleet vehicle 610b operable without authorization from the management server 240. For example, even if the malicious user replaces the motor controller 622 with another motor controller that does not require a key to operate, the battery module 624 would still not provide power to the propulsion system unless it receives the key from the vehicle controller 612.

In some embodiments, the vehicle controller 612 may be configured to authenticate the other components (e.g., verifying that the other components are associated with the dynamic transportation matching system 200) based on the key(s) (e.g., the secondary key) that was assigned (e.g., distributed) to the other components. For example, the vehicle controller 612 may authenticate the components of the shared micro-mobility fleet vehicle before unlocking the shared micro-mobility fleet vehicle 610b. Thus, upon receiving the unlock request (and the key) from the management server 240, the vehicle controller 612 may attempt to authenticate the other components of the shared micro-mobility fleet vehicle 610b before unlocking the shared micro-mobility fleet vehicle 610b. In some embodiments, the vehicle controller 612 may request the other components to provide the key that is stored in their respective OTP memories. The vehicle controller 612 may then determine whether the keys retrieved from the other components match the keys (e.g., the secondary key) that were assigned (distributed) to the other components during the provisioning of the shared micro-mobility fleet vehicle 610b. If all of the keys from the other components match the assigned key, the vehicle controller 612 may authenticate the components, and may unlock the shared micro-mobility fleet vehicle 610b. If any one of the keys from the components does not match (or no key is received from any one of the components), the vehicle controller 612 may determine that the corresponding component is not authenticated and may have been tampered with. In some embodiments, if the vehicle controller 612 fails to authenticate any one of the components of the shared micro-mobility fleet vehicle 610b, the vehicle controller 610b may not unlock the shared micro-mobility fleet vehicle 610b (e.g., prevent the shared micro-mobility fleet vehicle 610b from being unlocked or from operating). The vehicle controller 612 may also transmit a signal to the management server 240 indicating that the shared micro-mobility fleet vehicle 610b has been tampered with.

When tampering with the micro-mobility vehicle 610b, a malicious user may also tamper with (e.g., remove, replace, etc.) the vehicle controller 612 of the shared micro-mobility fleet vehicle 610b such that the shared micro-mobility fleet vehicle 610b cannot transmit any tampering report to the management server 240 via the vehicle controller. While the vehicle controller 612 may be the only component in the shared micro-mobility fleet vehicle 610b that may communicate with the management server 240 (e.g., via a cellular network, etc.), many other components of the shared micro-mobility fleet vehicle 610b (e.g., the motor controller 622, the battery module 624, etc.) may be equipped with a wireless short-range communication module (e.g., a Bluetooth® transmitter, etc.). Thus, in some embodiments, each of the components of the shared micro-mobility fleet vehicle 610b may detect tampering of any other component (e.g., removing, replacing, etc.) of the shared micro-mobility fleet vehicle 610b. When a component detects that another component (e.g., the motor controller 622, the battery module 624, the vehicle controller 612, etc.) of the shared micro-mobility fleet vehicle 610b has been tampered with, the component may establish a connection (e.g., a wireless short-range connection) with a vehicle docking station (e.g., the vehicle docking station 402) or with another vehicle (e.g., the vehicle 410a, etc.). The component may then transmit a tampering report signal that may include the identifier of the shared micro-mobility fleet vehicle 610b to the vehicle docking station or the other vehicle, and instruct the vehicle docking station or the other vehicle to relay the tampering report to the management server 240.

In some embodiments, in addition to the vehicle controller 612, each of the components of the shared micro-mobility fleet vehicle 610b may attempt to authenticate other components of the shared micro-mobility fleet vehicle 610b based on the secondary key. For example, when a component is unlocked (e.g., activated, switched to operation mode, etc.), the component may be required to broadcast its key to other components of the shared micro-mobility fleet vehicle 610b. Thus, the component may also receive keys broadcasted by the other components of the shared micro-mobility fleet vehicle 610b. If the key of a particular component is not received after a predetermined amount of time from being unlocked, the component may use its wireless transmitter to transmit a tampering report to a nearby docking station or another vehicle.

In one example, a component (e.g., the vehicle controller 612) of the shared micro-mobility fleet vehicle 610b may detect that the battery module 624 has been removed from the shared micro-mobility fleet vehicle 610b based on the secondary key (or the failure to receive the secondary key from the battery module 624). The component may then establish a short-range wireless connection with a nearby vehicle docking station (e.g., the vehicle docking station 402), and transmit a tampering report (including the identifier of the shared micro-mobility fleet vehicle 610b) to the vehicle docking station 402. In another example, a component (e.g., the vehicle controller 612) may detect that the motor controller 622 has been removed from the shared micro-mobility fleet vehicle 610b. The component may then establish a short-range wireless connection with a nearby vehicle docking station (e.g., the vehicle docking station 402), and transmit a tampering report (including the identifier of the shared micro-mobility fleet vehicle 610b) to the vehicle docking station 402. In yet another example, a component (e.g., the motor controller 622) may detect that the vehicle controller 612 has been removed (e.g., based on determining that the vehicle controller 612 is unresponsive). The component may then establish a short-range wireless connection with a nearby vehicle docking station (e.g., the vehicle docking station 402), and transmit a tampering report (including the identifier of the shared micro-mobility fleet vehicle 610b) to the vehicle docking station 402.

In some embodiments, when the vehicle docking station 402 determines that the vehicle controller 612 of the shared micro-mobility fleet vehicle 610b has been tampered with (e.g., removed) based on the tampering report transmitted by a component of the shared micro-mobility fleet vehicle 610b, the vehicle docking station 402 may verify the unresponsiveness of the vehicle controller 612 of the shared micro-mobility fleet vehicle 610b by attempting to establish a connection with the vehicle controller 610b. In other embodiments, the vehicle docking station 402 may use another nearby vehicle to verify the unresponsiveness of the vehicle controller 612 of the shared micro-mobility fleet vehicle 610b. For example, the vehicle docking station 402 may have an established connection with another vehicle (e.g., another shared micro-mobility fleet vehicle in proximity to the vehicle docking station 402, a vehicle near the vehicle docking station 402, etc.) due to an interruption of the connection between the vehicle docking station 402 and the management server 240. If there is no existing connection with another vehicle, the vehicle docking station 402 may determine another vehicle within the distance threshold from the vehicle docking station 402 and establish a connection with that vehicle. The vehicle docking station 402 may instruct the other vehicle (e.g., the shared micro-mobility fleet vehicle 410b, etc.) to attempt to communicate with the vehicle controller 612 of the shared micro-mobility fleet vehicle 610b. If it is verified that the vehicle controller 612 of the shared micro-mobility fleet vehicle 610b is unresponsive, the vehicle docking station 402 may relay the tampering report to the management server 240.

Thus, the vehicle docking station 402 (or the other vehicle) may determine that a nearby shared micro-mobility fleet vehicle has been tampered with, and obtain vehicle data, such as the identifier of the shared micro-mobility fleet vehicle from the tampering report. In response to determining a tampering of a nearby vehicle, the vehicle docking station 402 may increase a security level. For example, the vehicle docking station 402 may require additional credentials (e.g., biometrics, etc.) from a user (either the transportation requestor or a malicious user) when hiring a shared micro-mobility fleet vehicle that is docked at the vehicle docking station 402.

In another aspect of the disclosure, a mechanism for detecting tampering of vehicle docking stations is provided. In some embodiments, each of the vehicle docking stations (e.g., the vehicle docking station 402) may be configured to generate a verification code and transmit the verification code to the management server 240. The verification code, in some instances, may be generated as a hashed value based on data obtained from the management server 240. It is beneficial that the data on which the hashed value is based changes from time to time, such that hashed values generated based on outdated data can be expired and are no longer valid. In some embodiments, the data used to generate the hashed value may include software update data (data for updating the software installed on the vehicle docking stations, which may include a loader, u-boot data, a kernel, a Rootfs UBIFS volume dump, a filesystem tree crawling, etc.) that the management server 240 is configured to transmit to the vehicle docking stations from time to time. Each of the vehicle docking stations may be configured to generate a verification code (e.g., a hashed value) based on the most recent software update data received from the management server 240, and to transmit the verification code to the management server 240 via a heartbeat signal. The vehicle docking station may include the verification code and data associated with the software update data (e.g., a current system version, a current kernel version, etc.) in the heartbeat signal. In some embodiments, the vehicle docking stations need not transmit the verification code in every heartbeat signal, but only at a predetermined frequency (e.g., every day, every week, etc.) or in response to an event (e.g., a rebooting such as a power up event of the vehicle docking station). In some embodiments, the vehicle docking station does not store a generated verification code in memory, but is configured to generate the verification code each time it is required to send the verification code to the management server 240 (e.g., when the vehicle docking station is powered up, at a predetermined time, etc.).

Upon receiving the verification code from a vehicle docking station, the management server 240 may verify the verification code (e.g., determining whether the verification code corresponds to a hashed value of the most recent software update data). The management server 240 may authenticate a vehicle docking station (e.g., determining that the vehicle docking station has not been tampered with) if the verification code received from the vehicle docking station is verified. However, if the verification code received from a vehicle docking station is not verified or if a verification code is not received from a vehicle docking station at a predetermined time, the management server 240 may determine that the vehicle docking station has been tampered with (e.g., a hardware may have been removed or replaced without authorization of the transportation provider). The management server 240 may then send an alarm to one or more devices associated with the transportation provider such that personnel may inspect the vehicle docking station.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A vehicle docking station, comprising:
    a non-transitory memory; and
    one or more hardware processors coupled to the non-transitory memory and configured to read instructions from the non-transitory memory to cause the vehicle docking station to perform operations comprising:
        detecting that a communication link, that is between the vehicle docking station and a management server remote to the vehicle docking station, is unavailable;
        determining a vehicle within a distance threshold from the vehicle docking station;
        establishing a temporary communication connection with the vehicle while the communication link is unavailable; and
        transmitting station data associated with the vehicle docking station to the management server via the temporary communication connection.

2. The vehicle docking station of claim 1, wherein the operations further comprise:
    determining that the communication link between the vehicle docking station and the management server is restored; and
    in response to determining that the communication link between the vehicle docking station and the management server is restored, transmitting, to the management server via the communication link, second station data.

3. The vehicle docking station of claim 2, wherein the transmitting the second station data to the management server comprises:
    embedding the second station data into one or more heartbeat signals; and
    transmitting the one or more heartbeat signals to the management server via the communication link.

4. The vehicle docking station of claim 1, wherein the operations further comprise:
    generating a verification code for verifying the vehicle docking station based on software update data received from the management server; and
    transmitting the verification code to the management server via the temporary communication connection.

5. The vehicle docking station of claim 1, wherein the operations further comprise:
    in response to determining that the communication link between the vehicle docking station and the management server is restored, terminating the temporary communication connection with the vehicle.

6. The vehicle docking station of claim 1, wherein the vehicle is a shared micro-mobility fleet vehicle comprising an Internet-of-things (IOT) module, wherein the temporary communication connection is established with the IOT module of the micro-mobility fleet vehicle.

7. The vehicle docking station of claim 1, wherein the station data comprises at least one of information indicating a number of one or more vehicles docked at the vehicle docking station, information indicating a charge status of at least one of the one or more vehicles docked at the vehicle docking station, information indicating a physical condition of at least one of the one or more vehicles, network information associated with the vehicle docking station, or battery information associated with the vehicle docking station.

8. The vehicle docking station of claim 1, wherein the vehicle is a first vehicle, wherein the temporary communication connection is a first temporary communication connection, and wherein the operations further comprise:
determining that the first temporary communication connection between the first vehicle and the vehicle docking station is unavailable while the communication link between the vehicle docking station and the management server remains unavailable;
identifying a second vehicle within a distance threshold from the vehicle docking station;
establishing a second temporary communication connection with the second vehicle; and
transmitting third station data associated with the docking station to the management server via the second temporary communication connection.

9. A method, comprising:
in response to receiving first heartbeat signals from a vehicle docking station, transmitting, by a management server remote to the vehicle docking station via a first communication connection, a first acknowledgement signal indicating a receipt of the first heartbeat signals to the vehicle docking station, wherein the first heartbeat signals comprise station data associated with the vehicle docking station;
receiving, by the management server from a remote device, a request to establish a second communication connection with the remote device;
establishing, by the management server, the second communication connection with the remote device; and
in response to receiving second heartbeat signals from the vehicle docking station via the second communication connection, transmitting, by the management server to the vehicle docking station via the second communication connection established with the remote device, a second acknowledgement signal indicating a receipt of the second heartbeat signals.

10. The method of claim 9, further comprising:
subsequent to the transmitting the second acknowledgement signals to the vehicle docking station via the second communication connection and in response to receiving third heartbeat signals from the vehicle docking station via the first communication connection, transmitting, by the management server to the vehicle docking station via the first communication connection, a third acknowledgement signal indicating a receipt of the third heartbeat signals.

11. The method of claim 10, further comprising:
in response to receiving third heartbeat signals from the vehicle docking station via the first communication connection, terminating the second communication connection with the remote device.

12. The method of claim 9, further comprising:
extracting a verification code from the second heartbeat signals; and
authenticating the vehicle docking station based on the verification code.

13. The method of claim 9, wherein the remote device is a mobile device of a user.

14. The method of claim 9, wherein the remote device is part of a shared micro-mobility fleet vehicle, and wherein the station data comprises information indicating that the shared micro-mobility fleet vehicle is docked to the vehicle docking station.

15. The method of claim 14, wherein the shared micro-mobility fleet vehicle is not docked to the vehicle docking station when the second communication connection is established with the remote device.

16. A non-transitory machine-readable memory having stored thereon machine-readable instructions executable to cause a vehicle docking station to perform operations comprising:
determining that a connectivity between the vehicle docking station and the management server is unavailable;
determining that a remote device is within a distance threshold from the vehicle docking station;
establishing a communication connection with the remote device; and
transmitting station data associated with the vehicle docking station to the management server via the communication connection.

17. The non-transitory machine-readable memory of claim 16, wherein the operations further comprise:
determining that the connectivity between the vehicle docking station and the management server is restored; and
in response to determining that the connectivity between the vehicle docking station and the management server is restored, transmitting, to the management server, second station data via a second communication connection with the management server.

18. The non-transitory machine-readable memory of claim 17, wherein the operations further comprise:
receiving, from the management server via the second communication connection, acknowledgement signals acknowledging receipt of the heartbeat signals by the management server, wherein the determining that the connectivity with the management server is restored is based on receiving the acknowledgement signals.

19. The non-transitory machine-readable memory of claim 16, wherein the communication connection is a peer-to-peer wireless communication connection.

20. The non-transitory machine-readable memory of claim 16, wherein the remote device is a mobile device of a user.

* * * * *